(12) United States Patent
Christensen

(10) Patent No.: US 7,962,318 B2
(45) Date of Patent: Jun. 14, 2011

(54) METHODS FOR OPTIMIZING SYSTEM MODELS AND THE LIKE USING LEAST ABSOLUTE VALUE ESTIMATIONS

(75) Inventor: Gustav Christensen, Mission (CA); Penelope Janet Christensen, legal representative, Mission (CA)

(73) Assignee: Simon Fraser University, Burnaby, British Columbia (CA)

( * ) Notice: Subject to any disclaimer, the term of this patent is extended or adjusted under 35 U.S.C. 154(b) by 679 days.

(21) Appl. No.: 11/972,607

(22) Filed: Jan. 10, 2008

(65) Prior Publication Data

US 2008/0195361 A1     Aug. 14, 2008

Related U.S. Application Data

(60) Provisional application No. 60/884,367, filed on Jan. 10, 2007.

(51) Int. Cl.
*G06F 7/60* (2006.01)
*G06F 17/10* (2006.01)

(52) U.S. Cl. .......................................... 703/2
(58) Field of Classification Search ........................ 703/2
See application file for complete search history.

(56) References Cited

U.S. PATENT DOCUMENTS 6,408,109 B1 * 6/2002 Silver et al. .................. 382/300

OTHER PUBLICATIONS

Sklar, Michael G. and Armstrong, Ronald D,Least absolute value and chebychev estimation utilizing least squares results, 1982, Springer Berlin / Heidelberg, vol. 24, No. 1, pp. 346-352.*
Soliman et al., "A New Algorithm for Nonlinear L1-norm Minimization with Nonlinear Equality Constraints", Computational Statistics & Data Analysis, vol. 11, 1991, pp. 97-109.
Soliman et al., "A New Technique for Curve Fitting based on Minimum Absolute Deviations", Computational Statistics & Data Analysis, vol. 6, 1988, pp. 341-351.
Christensen et al., "Discussion of 'An Example Showing that a New Technique for LAV Estimation Breaks Down in Certain Cases'", Computational Statistics & Data Analysis, vol. 9, 1990, pp. 203-213.
Christensen et al., "Optimal Filtering of Linear Discrete Dynamic Systems based on Least Absolute Value Approximations" Automatica, No. 2, 1990, pp. 389-395.
Barrodale et al., "An Improved Algorithm for Discrete L1 Linear Approximation", Siam Journal on Numerical Analysis, vol. 10, No. 5, 1973, pp. 839-848.

(Continued)

*Primary Examiner* — Paul L Rodriguez
*Assistant Examiner* — Luke Osborne
(74) *Attorney, Agent, or Firm* — Oven Wiggs Green & Mutala LLP

(57) ABSTRACT

Methods are provided for fitting a curve to a set of data values using a least absolute value (LAV) cost function. The set of data values may comprise m sets of data values. The method takes advantage of contraction mapping to determine a number n<m of individual equations which are interpolated by the curve to be fitted, where n corresponds to the number of parameters $x_1, x_2, \ldots, x_n$ to be ascertained for the curve to be fitted. The method then involves solving the n selected equations to determine the n parameters $x_1, x_2, \ldots, x_n$ of the curve to be fitted. Selection of these parameters ensures that the curve to be fitted minimizes the LAV cost function.

24 Claims, 7 Drawing Sheets

OTHER PUBLICATIONS

Kotiuga et al., "Bad Data Rejection Properties of Weighted Least Absolute Value Techniques Applied to Static State Estimation", IEEE Transactions on Power Apparatus and Systems, vol. PAS-101 No. 4, 1982, pp. 844-853.

D. Nelson, The Penguin Dictionary of Mathematics, Third Edition, Penguin Books, New York, 2003, p. 362.

Mili et al., "Least Median of Squares Estimation in Power Systems", IEEE Transactions on Power Systems, vol. 6, No. 2, 1991, pp. 511-523.

Mili et al., "A Robust Estimation Method for Topology Error Identification", IEEE Transactions on Power Systems, vol. 14, No. 4, Nov. 1999, pp. 1469-1476.

K.M.M El-Naggar, "Estimation of Harmonics in Electrical Power Systems", Ph.D. Thesis, Department of Electrical Engineering, University of Alberta, Apr. 16, 1992, Ph.D. Supervisor: G.S. Christensen, 227 Pages.

* cited by examiner

METHODS FOR OPTIMIZING SYSTEM MODELS AND THE LIKE USING LEAST ABSOLUTE VALUE ESTIMATIONS

RELATED APPLICATIONS

This application claims the benefit of the priority date of U.S. application No. 60/884,367 filed 10 Jan. 2007.

TECHNICAL FIELD

The invention disclosed herein relates to methods for fitting curves to sets of data points (e.g. experimentally determined data points). Particular embodiments of the invention provide methods for optimizing solutions to least absolute value (LAV) curve fitting problems.

BACKGROUND

The scientific method depends on conducting experiments and analyzing the data obtained from such experiments. Often, the data analysis involves statistical methods. When analyzing experimentally obtained data, it is often helpful to fit the experimentally obtained data to a curve. This process may be referred to as "curve fitting". Curve fitting typically involves defining a "curve" (i.e. a function sometimes referred to as a "model") that relates one data value to one or more other data values and selecting parameters of the curve such that the curve estimates the relationship between the data values. By way of non-limiting example, selection of the parameters of the curve may involve selection of coefficients of a polynomial function.

The curve established in the curve fitting process is typically an estimate, and not an exact representation, of the relationship between the known data values. The curve fitting process may involve the use of a cost function which provides a metric as to how closely the curve determined in the curve fitting process estimates the relationship between the data values. Curve fitting processes often seek to determine a curve which minimizes (or maximizes) the cost function. Minimization (or maximization) of the cost function may be referred to as "optimizing" the fitted curve.

One well known example of a cost function is the "least squares" cost function. The least squares cost function represents a sum of the squares of the residuals—i.e. a sum of the squares of the differences between values generated by the fitted curve and corresponding values from the data. Optimizing a fitted curve using a least squares cost function is a well known problem for which there are a number of known solutions. Examples of such solutions include the so called "Newton's method" and "gradient descent method".

There are many drawbacks with the least squares cost function and the associated optimization methods. For example, iterative optimization is generally required to minimize the cost functions associated with non-linear models. Iterative optimization is typically performed using suitably programmed computer(s) or similar data processor(s). Using a least square cost function and the gradient descent method requires a relatively large number of iterations for the optimization to converge. Optimization techniques involving a large number of iterations are computationally expensive (i.e. requiring relatively large amounts of processing time and/or computational storage). Another drawback associated with least squares optimization processes is that they are relatively non-robust to outlying data values. Accordingly, if there is an obvious error with one or more of the data values (e.g. because a number was mistyped into a keyboard or a measurement apparatus was uncalibrated at the time of measurement), the resultant model obtained using least squares optimization could be skewed.

There is a desire to provide optimization methods for curve fitting which are relatively easy to perform and which ameliorate some of the drawbacks associated with prior art techniques.

BRIEF DESCRIPTION OF THE DRAWINGS

In drawings which schematically illustrate non-limiting embodiments of the invention.

DESCRIPTION

One aspect of the invention provides a method for fitting a curve to a set of data values using a least absolute value (LAV) cost function. The set of data values may comprise m sets of data values. The method takes advantage of contraction mapping to determine a number n<m of individual equations which are interpolated by the curve to be fitted, where n corresponds to the number of parameters $x_1, x_2, \ldots, x_n$ to be ascertained for the curve to be fitted. The method then involves solving the n selected equations to determine the n parameters $x_1, x_2, \ldots, x_n$ of the curve to be fitted. Selection of these parameters ensures that the curve to be fitted minimizes the LAV cost function.

The methods may be used for linear and non-linear models with or without constraints on the model as described in more particular detail below.

Figure 1:
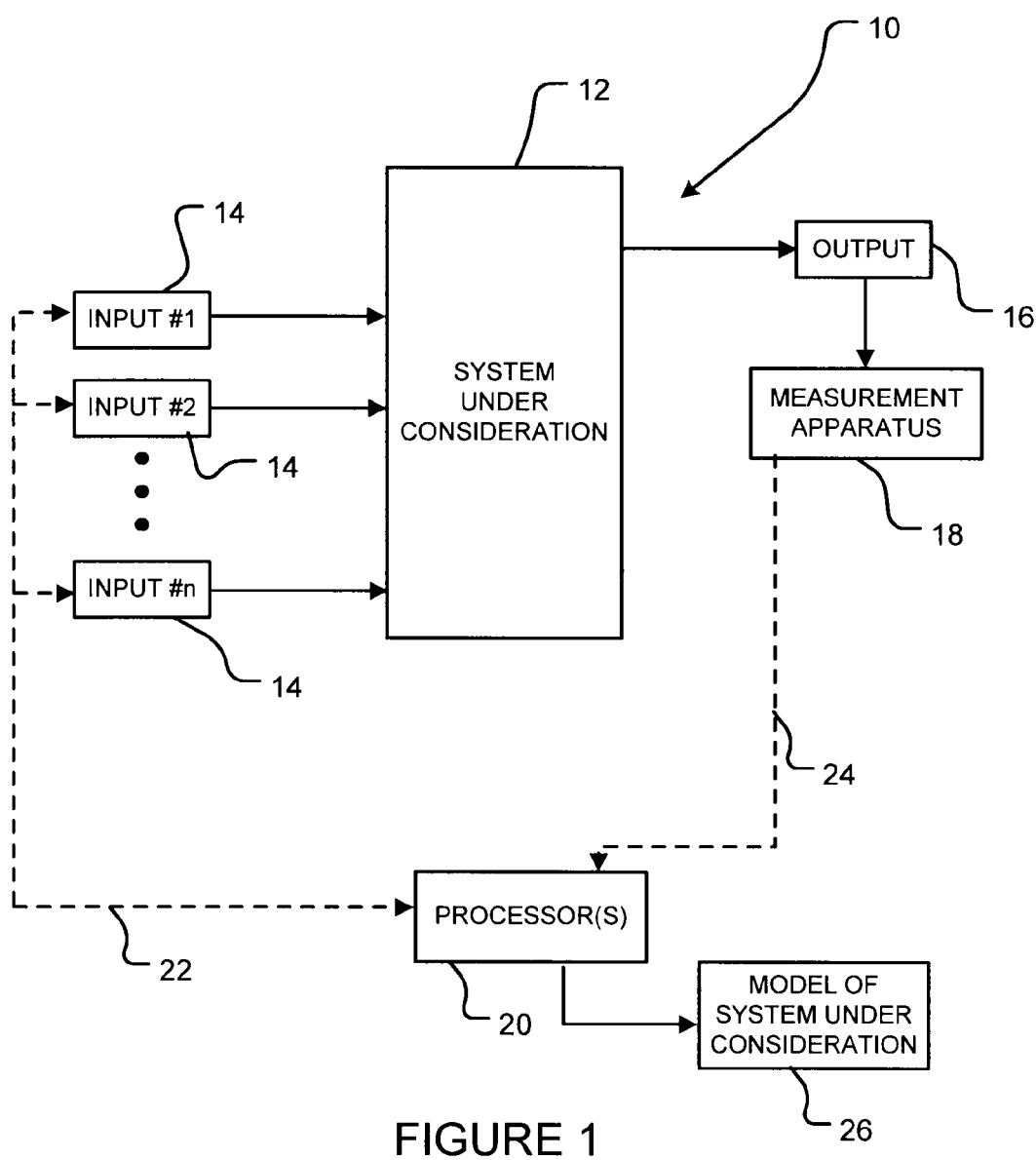
FIG. 1 is a depiction of an exemplary environment suitable for practicing various embodiments of the invention.

FIG. 1 schematically depicts an exemplary environment 10 in which the particular embodiments of the invention may be employed. Environment 10 comprises a system of interest 12. System 12 is provided with one or more inputs 14 and an output 16. In the illustrated embodiment, system 10 comprises one output 16 and as many as n inputs 14. Output 16 may be measured by measurement apparatus 18, which, by way of non-limiting example, may comprise one or more sensors, transducers or the like. In other embodiments, system 12 may comprise a plurality of outputs 16. In some embodiments, output(s) 16 are provided by system 12 in a form which can be determined without explicit measurement, in which case measurement apparatus 18 is not required. In the particular exemplary environment 10, it is desired to obtain a model 26 which approximates the response of system 12 to inputs 14—i.e. model predicts output 16 for a given set of inputs 14. Model 26 may also be referred to herein as a "curve" or the like.

In the illustrated embodiment, model 26 is determined by processor(s) 20 which perform(s) a methods according to particular aspects of the invention as described in more particular detail below. Processor(s) 20 may generally include any data processing device(s) capable of performing the functions described herein. By way of example, processor(s) 20 may comprise one or more suitably programmed computer(s), one or more suitably programmed microprocessors, one or more suitably programmed PLC devices or the like and may include a combination of such data processing devices.

In the illustrated embodiment, processor(s) 20 are configured to optionally control inputs 14 via signal(s) 22 and processor(s) 20 are configured to receive the measured value of output 16 from measurement apparatus 18 via signal(s) 24. Suitable hardware and/or software (not explicitly shown) may be used to effect the communication of signals 22, 24. In some embodiments, processor(s) 20 may be provided with information relating to inputs 14 and output 16 using other techniques. For example, inputs 14 may be manually controlled or controlled by a separate input controller and output 16 and/or measurement apparatus 18 may be manually read. The values of inputs 14 and output 18 may be provided to processor(s) 20 by some other suitable input means. By way of non-limiting example, the values of inputs 14 and output 16 may be keyboarded into processor(s) 20 or read into processor(s) 20 from a disc drive.

Figure 2:
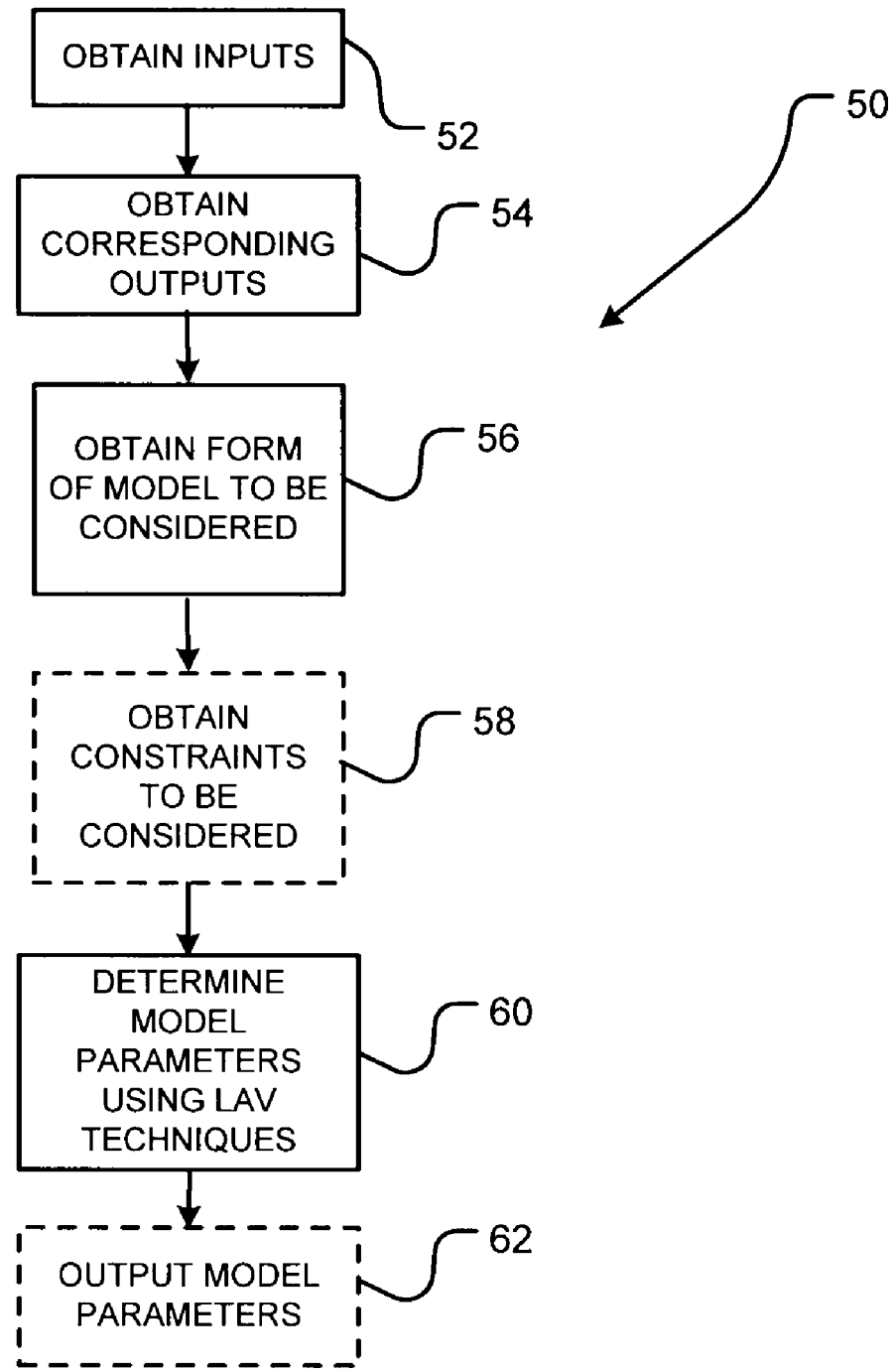
FIG. 2 shows a method for determining a model of the FIG. 1 system under consideration according to a particular embodiment of the invention.

FIG. 2 schematically depicts a method 50 according to a particular embodiment of the invention which may be used in environment 10 to determine a system model 26. Method 50 may be performed, at least in part, by processor(s) 20. Method 50 starts in block 52 which involves obtaining the values of inputs 14. Inputs 14 may be provided to processor(s) 20 using any suitable technique including, without limitation, those discussed above. Method 50 then proceeds to block 54 which involves obtaining the values of output 16 corresponding to each set of n inputs. Outputs 16 may be provided to processor(s) 20 using any suitable technique including, without limitation, those discussed above. In total, blocks 52 and 54 may involve obtaining m sets of inputs 14 and m corresponding outputs 16.

Method 50 then proceeds to block 56 which involves obtaining a form of model to be considered. The form of model may be provided to processor(s) 20 in any suitable manner. By way of non-limiting example, the form of model may be provided to processor(s) 20 via software instructions. Such software instructions may be provided to processor(s) 20 by any suitable input means and may provide processor(s) 20 with the form of model when the software instructions are executed by processor(s) 20. In another non-limiting example, processor(s) 20 may be provided with a user interface that queries a user to input the form of model in block 56. In the particular embodiment of method 50 illustrated in FIG. 2, system model 26 is determined by a number n of model parameters.

Method 50 then proceeds to optional block 58 which involves obtaining any constraint(s) which may need to be considered. Optional constraints may be provided to processor(s) 20 in any suitable manner. By way of non-limiting example, the optional constraints may be provided to processor(s) 20 via software instructions. Such software instructions may be provided to processor(s) 20 by any suitable input means and may provide processor(s) 20 with the constraints and/or the form of constraint when the software instructions are executed by processor(s) 20. In another non-limiting example, processor(s) 20 may be provided with a user interface that queries a user to input any optional constraints in block 58.

Method 50 then proceeds to block 60 which involves determining the model parameters using LAV techniques. It will be appreciated that in the illustrated embodiment of method 50, determining the model parameters is sufficient to specify model 26 of system 12. Particular embodiments illustrating a number of techniques suitable of use in block 60 for determining model parameters using LAV techniques are described in more detail below.

Method 50 then proceeds to optional block 62 which involves outputting the model parameters determined in block 60. It will be appreciated that in the illustrated embodiment of method 50, outputting the model parameters is sufficient to specify model 26 of system 12.

The Linear Measurement Equation

We define a set of data values which include:
(i) a data matrix $\underline{H}$ (where $\underline{H} \in R^{m \times n}$ is of maximal rank); and
(ii) a m×1 data vector $\underline{z}$, where m>n. The elements of data matrix $\underline{H}$ and the elements of the data vector $\underline{z}$ may represent experimentally obtained data, for example. In this description, we refer to the individual elements of the data matrix $\underline{H}$ as $a_{ij}$, where i represents the row and j represents the column of the element $a_{ij}$. In some embodiments, the elements of each row of data matrix $\underline{H}$ (e.g. $a_{i1}, a_{i2}, \ldots a_{in}$) may represent "input" or "controllable" or "independent" or "explanatory" variables (e.g. inputs 14 of environment 10 (FIG. 1)) and the element in each row of data vector $\underline{z}$ (e.g. $z_i$) may represent a corresponding "output" or "measured" or "dependent" or "response" variable (e.g. output 16 of environment 10 (FIG. 1)). Despite the use of this language to describe the data variables $\underline{H}$ and $\underline{z}$, in general, causality between data matrix $\underline{H}$ and data vector $\underline{z}$ is not a required feature of the invention disclosed herein.

In accordance with particular embodiments of the invention, we assume that each element $z_i$ of output data vector $\underline{z}$ is a linear combination of n state variables $x_1, x_2, \ldots x_n$ to be estimated corrupted by a corresponding disturbance $v_i$. The n state variables $x_1, x_2, \ldots x_n$ may be represented by an n×1 state variable vector $\underline{x}$ and the m disturbances $v_i$ may be represented by an uncertain m×1 disturbance vector $\underline{v}$. The state variable vector $\underline{x}$ may represent model 26 (FIG. 1) of system 12 and the n state variables $x_1, x_2, \ldots x_n$ may represent the parameters of model 26.

We may then express the relationship between $\underline{z}$, $\underline{H}$, $\underline{x}$, and $\underline{v}$ in the following form $$\underline{z} = \underline{H}\underline{x} + \underline{v} \qquad (1)$$

For the sake of convenience, equation (1) may be referred to as a "measurement equation" and each of the individual elements $z_i$ of the output data vector $\underline{z}$ may be referred to as "measurements".

The $i^{th}$ measurement $z_i$ in measurement equation (1) can be written in component form as:

$$z_i = \underline{H}_i \underline{x} + v_i \quad i = 1, 2, \ldots, m \qquad (2)$$

where $\underline{H}_i \in R^{1 \times m}$ and $\underline{x}$ is an n-dimensional state vector made up of parameters $x_1, x_2, \ldots x_n$. In accordance with particular embodiments of the invention, it is desired to estimate the parameters $x_1, x_2, \ldots x_n$ which determine the n-dimensional state vector $\underline{x}$ (e.g. model 26) using output data values $z_i$ (e.g. from output 16) and input data values $\underline{H}_i$ (e.g. from inputs 14). Method 50 (FIG. 2) represents a particular embodiment of a method for obtaining such an estimate.

Least Absolute Value Estimator

One aspect of the invention provides new methods which make use of least absolute value (LAV) residuals to estimate the n-dimensional state vector x (i.e. the parameters $x_1$, $x_2$, ... $x_n$) in the measurement equation (1). By way of non-limiting example, such methods may be used to implement block 60 of method 50 (FIG. 2). As used herein, an individual LAV residual represents the absolute value of the difference between the value predicted by the proposed (or estimated) function (e.g. model 26) and the corresponding measurement $z_i$. In particular embodiments of the invention, methods are used to determine the value of x (i.e. the parameters $x_1$, $x_2$, ... $x_n$) which minimizes a cost function representing the sum of the LAV residuals over the m individual measurements ($z_1$, $z_2$, ... $z_m$).

It may be shown that:

Theorem if the column rank of the matrix $H \in R^{m \times n}$ in (1) is $k \leq n < m$, then there exists a best LAV approximation (referred to herein as $Hx_{LAV}$) which interpolates at least k points of the set $\underline{z} = [z_1, z_2, \ldots, z_m]^T$ in (1).

In other words, if we have m measurements $z_1, z_2, \ldots z_m$ (e.g. m outputs 16) and input data values (e.g. from inputs 14) corresponding to each of the m measurements to form $H \in R^{m \times n}$ and if the rank of H is $k \leq n < m$, then the best LAV approximation $Hx_{LAV}$ interpolates at least k of the m measurements $z_1, z_2, \ldots z_m$. A particular measurement $z_i$ is interpolated when its corresponding disturbance $v_i$ is zero in measurement equation (1). Accordingly, if the conditions of the above theorem are met, then the disturbance vector v of measurement equation (1) includes k elements for which $v_i = 0$. This interpolation of the best LAV approximation $Hx_{LAV}$ contrasts with the least squares approximation which does not necessarily pass through any of the individual measurements $z_1, z_2, \ldots z_m$.

For the measurement equation (1), the LAV cost function to be minimized may be written as $$J(\underline{x}) = \sum_{i=1}^{m} |v_i| = \sum_{i=1}^{m} row_i |z - Hx| \quad (3)$$

In an n-dimensional linear space, the so called p-norm of a vector $\underline{v} = [v_1, v_2, \ldots, v_n]^T$ can be defined by means of the formula $$\|\underline{v}\|_p = \left( \sum_{k=1}^{n} |v_k|^p \right)^{1/p} < \infty \quad p = 1, 2, \ldots \quad (4)$$

For $p=1$ and $k=1, \ldots, n$ equation (4) can be written as $$\|\underline{v}\| = |v_1| + |v_2| + \ldots + |v_n| \quad (5)$$

where $\|\cdot\|$ represents the 1-norm in this description.

On the basis of the norm axioms, we know $\|\underline{v}\| = 0$ if and only if $\underline{v} = 0$. Consequently, the cost function in equation (3) is a minimum when $$v_i = (z_i - H_i \underline{x}) = 0 \text{ for } i = 1, 2, \ldots, m \quad (6)$$

Equation (6) characterizes an over-determined system of equations, since $m > n$.

Optimization using LAV estimation is advantageous over prior art techniques because, as pointed out by the above-presented Theorem, a number k of the individual measurements are interpolated by the approximation $Hx_{LAV}$. As described in more detail below, this feature results in outlying measurements being rejected by the optimization methods of the invention. The rejection of outlying measurements can be seen by realizing that the residual error due to an outlying measurement will be significant. Consequently, the outlying measurement will not be one of the k measurements interpolated by the approximation $Hx_{LAV}$.

Contraction Mapping

The usual representation for any optimization problem is a correspondence between the measurement vector $\underline{z}$ and the estimated state vector $\underline{x}$. The measurement vector $\underline{z}$ and the estimated state vector $\underline{x}$ are identified as belonging to a metric space, endowed with a mathematical structure suited to the type of analysis desired. A metric space X which has the property that every Cauchy sequence in X has a limit in X is said to be "complete". Furthermore, if a normed linear space is complete, it is called a "Banach" space.

In particular embodiments of the invention, the space best suited for our analysis is a Banach space. As described in more detail below, a Banach space is convenient, because it facilitates the application of contraction mapping when we desire to determine the optimal value of x in (6).

Consider the set of ordered n-tuples of real numbers with the distance function $$d(\underline{x}, \underline{y}) = \sum_{k=1}^{n} |x_k - y_k| \quad (7)$$
$$= \|\underline{x} - \underline{y}\|$$

which forms the metric space $l_1$ and corresponds to the norm given by equation (4) with $p=1$. It is readily seen that the function $\|x\|$, defined on $R^n$ by (7) forms a norm on the Banach space $R^n$.

Consider the mapping f: $R^n \to R^n$, $\underline{x} \mapsto A\underline{x}$ given by the system of linear equations $$x_i = \sum_{j=1}^{n} a_{ij} x_j + b_i \quad (8)$$
$$i = 1, 2, \ldots, n$$

where $a_{ij}$ are the elements of the matrix A and compare this system of equations to the measurement equation (1). A mapping A, of $R^n$, into itself is referred to as a "contraction mapping" if there exists a number $\alpha < 1$ such that $$d(A\underline{x}, A\underline{y}) \leq \alpha d(\underline{x}, \underline{y}) \forall \underline{x}, \underline{y} \in R^n \quad (9)$$

If a matrix A is a contraction mapping, then we can apply a method of successive approximations to determine the solution of the equation $$\underline{x} = A\underline{x} \quad (10)$$

It can be shown that every contraction mapping defined in the Banach space $(R^n, \|\cdot\|)$ has one and only one fixed point, i.e., the equation $A\underline{x}_i = \underline{x}_{i+1}$ has one and only one solution $$\underline{x} = \lim_{n \to \infty} \underline{x}_n = 0 \quad (11)$$

Furthermore, it can be shown that the distance between two values of $\underline{x}_i$ is given by $$d(\underline{x}_n, \underline{x}_m) \leq \alpha^n d(\underline{x}_0, \underline{x}_1)/(1-\alpha) \quad (12)$$

where $\alpha < 1$. It may be concluded, therefore, that the sequence $\underline{x}_0, \underline{x}_1, \ldots, \underline{x}_n$ forms a Cauchy sequence since the right hand side of (12) tends to zero as n tends to infinity.

When equation (12) is true, then we can always approximate the solution of equation (11) as indicated in (13). We can limit the solution of (13) by excluding only the last few consecutive terms in (13). However, the larger the number of terms we use in (13) the more accurate is the solution given by (13).

The solution of (10), obtained by successive approximations, is given by $$\underline{x} = \underline{x}_0 + (\underline{x}_1 - \underline{x}_0) + \ldots + (\underline{x}_n - \underline{x}_{n-1}) \quad (13)$$

and inspection of (12) clearly indicates that (13) converges rapidly if $\alpha \ll 1$. Having $\alpha \ll 1$ is desirable, since we want to perform the smallest number of iterations possible, in order to obtain a good estimate of the solution x.

We now apply these contraction mapping results to the system of equations given by (8) using the distance function (7). It can then be shown (see Appendix A) that (8) is a contraction mapping if $$\Sigma_i |a_{ij}| \leq \alpha 1 \; \forall j \in \{1, \ldots, n\} \quad (14)$$

that is, only if (8) is seen as a mapping of the form $$f : (R^n, \|\cdot\|) \to (R^n, \|\cdot\|), \underline{x} \mapsto A\underline{x} + \underline{b}$$

Particular Embodiment for Unconstrained Optimization

Figure 3:
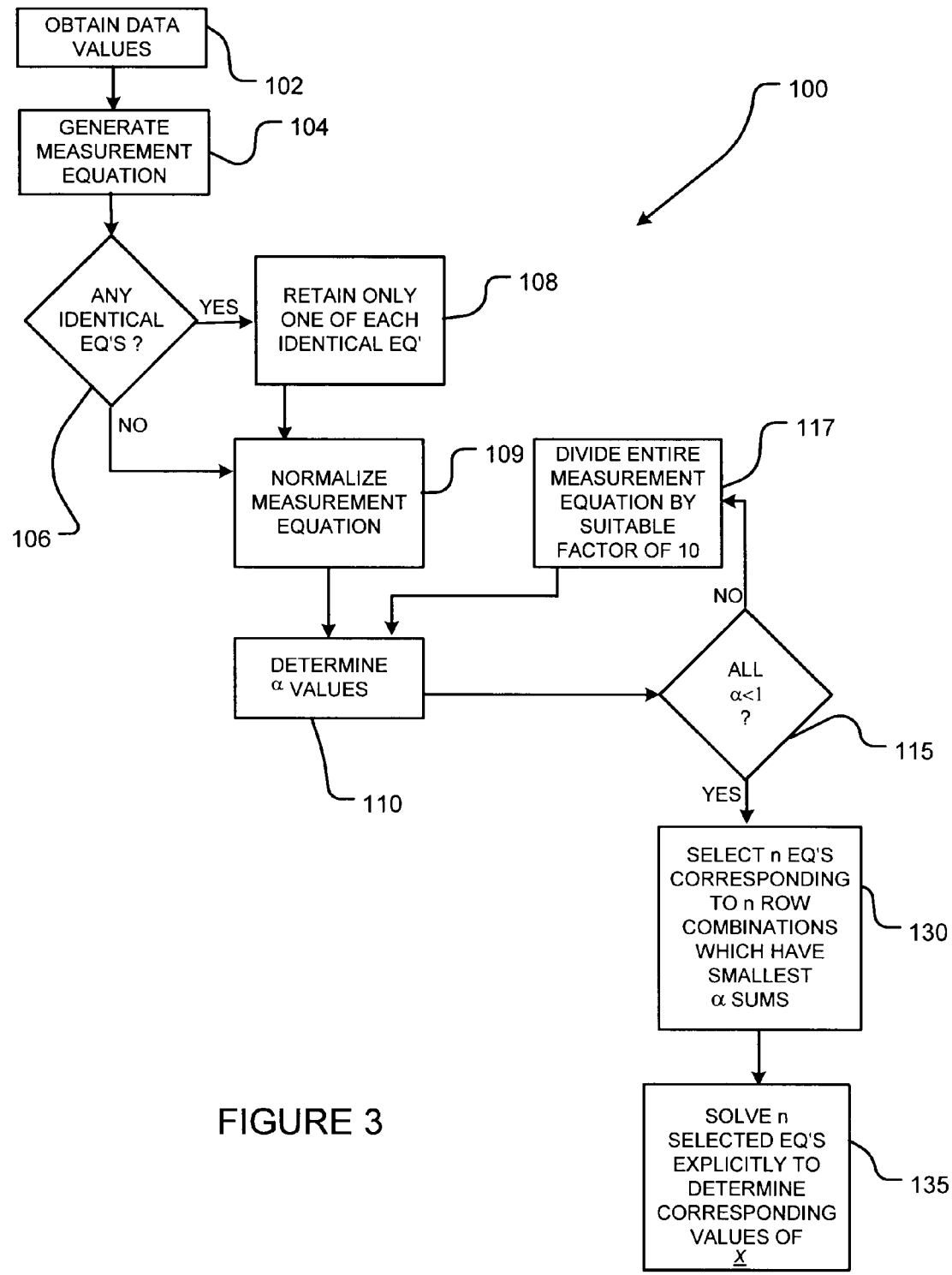
FIG. 3 shows a method for optimizing a curve/model to a set of data values according to a particular embodiment of the invention where the curve/model is unconstrained.

FIG. 3 illustrates a particular embodiment of a method 100 for optimizing a curve/model x defined by n parameters $x_1, x_2, \ldots, x_n$ for a set of data values $\underline{H}, \underline{z}$ according to a particular embodiment of the invention. For example, method 100 may involve estimating n parameters $x_1, x_2, \ldots, x_n$ which define a model 26 of system 12 (FIG. 1). Method 100, which comprises determining the n model parameters $x_1, x_2 \ldots x_n$ using LAV techniques, may be performed in block 60 of method 50 (FIG. 2).

It will be recalled from the above-discussed Theorem that if the rank of the matrix H in measurement equation (1) is k, the best LAV approximation $\overline{Hx}_{LAV}$ interpolates k of the measurements $z_1, z_2, \ldots z_m$ in (1). For these k interpolated measurements $z_i$, the corresponding $v_i=0$ will be zero in equation (3). As described in more detail below, method 100 makes use of the m measurements $z_1, z_2, \ldots z_m$ in (1), but involves selection of a desired subset of n measurements to be interpolated using relation (14) where we assume that k=n in the Theorem stated above.

Referring to FIG. 3, block 102 involves obtaining data values corresponding to data matrix $\underline{H}$ and measurements z. In particular embodiments, the data values $\underline{H}, \underline{z}$ may comprise experimentally determined data obtained from system of interest 12 (e.g. a m×n input matrix H of inputs 14 and a m×1 output vector of measured outputs $\overline{16}$). The data obtained in block 102 of FIG. 3 may correspond to inputs 14 of system 12 and corresponding outputs 16 of system 12 obtained in blocks 52, 54 of method 50 (FIG. 2). System 12 may generally include any system from which data may be measured or otherwise ascertained. By way of non-limiting example, system of interest 12 may be an electrical circuit, a wireless communication system, a chemical system, a mechanical system, a financial system, a theoretical system or any other suitable system. In some embodiments, the data values $\underline{H}, \underline{z}$ may comprise m data sets, where each data set comprises one or more independent (explanatory) variables (e.g. inputs 14) and a corresponding measured dependent (response) variable (e.g. outputs 16). By way of non-limiting example, in an electrical circuit system, a set of data values may comprise independent (explanatory) variables which include the amplitude of voltage and/or current inputs to the system and a measured dependent (response) variable that is the measured voltage output of the system. As another non-limiting example, in the case of a chemical system, a set of data values may comprise independent (explanatory) variables which include the temperature of the reaction chamber and/or the concentration of a reactant X and a measured dependent (response) variable which may include the concentration of the reaction product Y.

While the block 102 data values in particular embodiments of the invention include experimentally determined data, this is not necessary. In general, the block 102 data values may comprise m sets of data values and each set of data values may comprise n+1 individual data elements. These data values may be obtained in any suitable manner. Method 100 then proceeds to block 104, which involves generating a measurement equation of the form described above in (1). The data matrix $\overline{H}$ and the data vector z are constructed from the block 102 data values. The block 102 data values may comprise m sets data values and each such set may comprise n+1 individual data elements. In block 104, each set of n+1 individual data elements from block 102 is used to form one row $H_i$ (consisting of n individual data elements $(a_{i1}, a_{i2}, \ldots a_{in})$) of the data matrix H and one row $z_i$ (consisting of a single data element) of the data vector z. Since the block 102 data values comprise m sets of data, the data matrix H of the block 104 measurement equation is an m×n dimensional matrix and the data vector z of the block 104 measurement equation is a m×1 dimensional vector.

The state variable vector x in the measurement equation (1) is a n×1 vector and the individual elements $x_1, x_2, \ldots x_n$ of the state variable matrix x represent the variable parameters (as yet unknown) of the curve/model to be fitted (e.g. the parameters (as yet unknown) of model 26). In general the parameters $x_1, x_2, \ldots x_n$ may correspond to any suitable parameters of any suitable curve. By way of non-limiting example, the curve to be fitted may be a polynomial curve of the form $f(b) = x_1 + x_2 b + x_3 b^2 + \ldots x_n b^{n-1}$ such that the individual elements $x_1, x_2, \ldots x_n$ of the state variable matrix x represent the coefficients of the polynomial. As another non-limiting example, the curve to be fitted may be an exponential curve of the form $f(b) = x_1 e^{x_2 x}$. The disturbance vector v is a m×1 vector whose individual elements $v_1, v_2, \ldots v_m$ represent the (as yet unknown) error between the fitted curve and the individual measurements $z_1, z_2, \ldots z_m$.

It will be appreciated that the block 104 measurement equation (as represented by (1)) actually comprises m individual equations having the form of equation (2).

Block 106 involves an optional inquiry into whether any of the m individual equations in the block 104 measurement equation (1) are identical to one another. If there are no identical equations (block 106 NO output), then method 100 proceeds to block 109 with the full set of m individual equations. On the other hand, if there are one or more identical equations (block 120 YES output), then method 100 proceeds to block 108 where such identical equations are removed from the measurement equation to yield a measurement equation with a reduced set of $m_l$ individual equations ($m_l > n$). Unless explicitly mentioned, it is assumed for the remainder of this description that the block 106 inquiry is negative (i.e. that method 100 proceeds with a full set of m individual equations). It will be appreciated that this assumption yields no loss of generality, provided that $m_l > n$. That is, the results obtained using a reduced set $m_l > n$ of equations are obtained in a similar manner to those obtained using a full set m of equations by replacing m with $m_l$.

Block 109 involves normalizing the block 104 measurement equation (1). The block 109 normalization process involves dividing each of the m individual equations in the block 104 measurement equation (1) by a suitable corresponding normalizing constant such that the data vector z becomes $z=[z_1, z_2, \ldots, z_m]^T=[0.1, 0.1, \ldots, 0.1]^T$. To achieve a data vector $z=[z_1, z_2, \ldots, z_m]^T=[0.1, 0.1, \ldots, 0.1]^T$, the block 109 normalizing constants may be different as between the m individual equations in the block 104 measurement equation (1). It is a well known mathematical principal that dividing both sides of an equation by a constant does not alter the validity of the equation. The remainder of the description of method 100 assumes that we are referring to the normalized measurement equation obtained in block 109.

In the illustrated embodiment, block 110 comprises determining a set of parameters referred to as "α values" for the normalized H matrix. In general, for a normalized measurement equation having a m×n input matrix H, there are n α values for each possible combination of n rows of the normalized H matrix. For the purposes of this description, we adopt the following notation $$\alpha_i|_{j,k,l,\ldots} = |a_{ji}| + |a_{ki}| + |a_{li}| + \ldots \quad (14')$$

where:
  i corresponds to an α value calculated from the elements of the $i^{th}$ column of the normalized H matrix;
  j, k, l, ... corresponds to a row combination of the $j^{th}$, $k^{th}$, $l^{th}$ ... rows, where the number of rows in any particular row combination is n; and
  $a_{xy}$ corresponds to the element of the normalized H matrix at row x, column y. In accordance with equation (14'), the α value $\alpha_i|_{j,k,l}, \ldots$ is calculated by summing the absolute values of elements in the $i^{th}$ column from the $j^{th}$, $k^{th}$, $l^{th}$ ... rows of the normalized H matrix—i.e. $|a_{ji}|+|a_{ki}|+|a_{li}|+\ldots$. The total number of elements $a_{xy}$ of the normalized H matrix used to calculate a particular α value (corresponding to the number of rows in any given row combination) is n and these n elements are always selected from the same column of the normalized H matrix. In some instances, an α value $\alpha_i|_{j,k,l}, \ldots$ may be referred to in an abbreviated form $\alpha_i$, where the i refers to an α value calculated from the elements of the $i^{th}$ column of the normalized H matrix and the particular row combinations k, l, ... used to calculate the α value is omitted from the notation.

Figure 4:
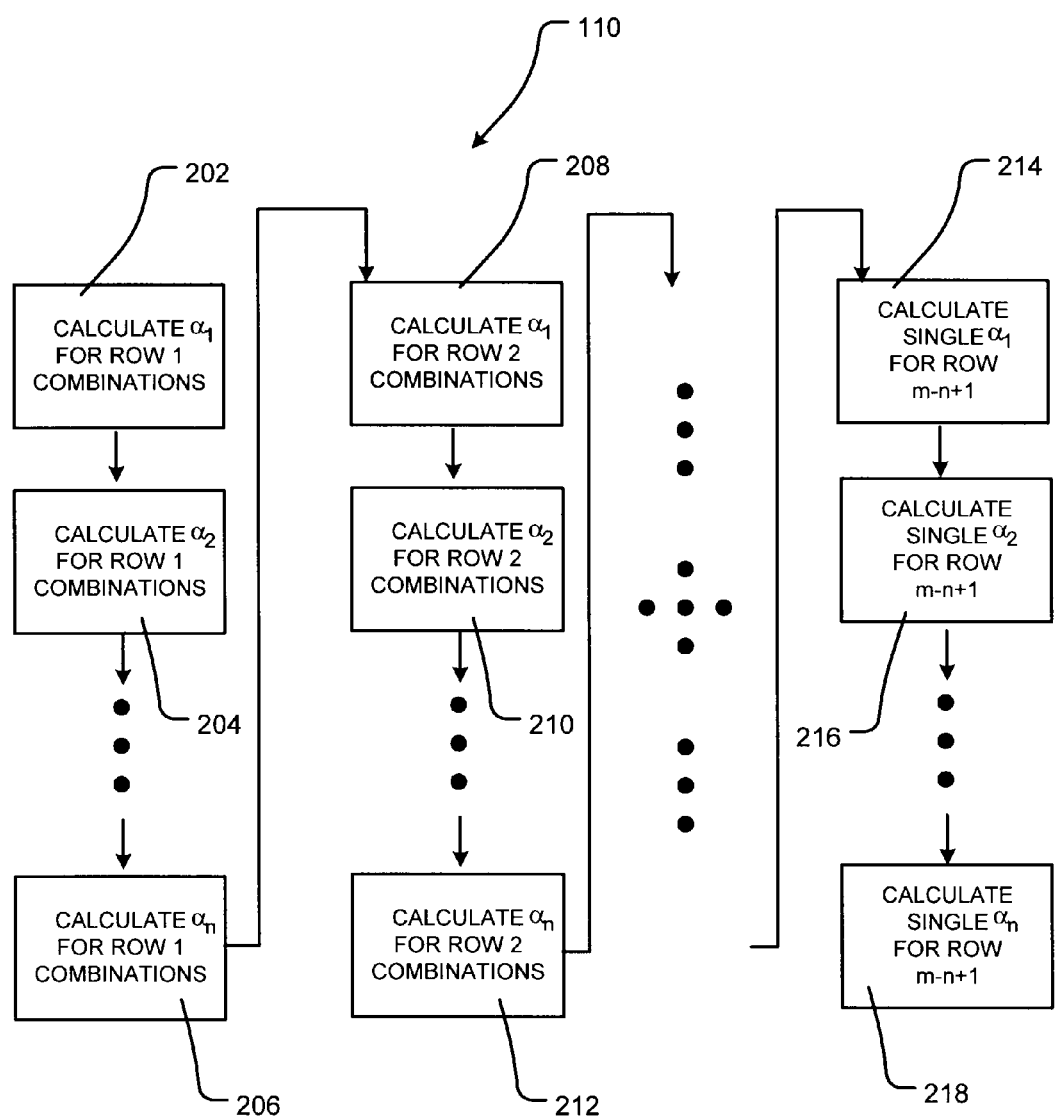
FIG. 4 shows a particular method for obtaining $\alpha$ values suitable for use with the optimization methods described herein.

FIG. 4 shows a method 110 for determining the particular α values of a given normalized H matrix according to a particular embodiment of the invention. It will be appreciated that method 110 illustrated in FIG. 4 represents one among many suitable methods which may be used to implement block 110 of method 100 (FIG. 3)—i.e. to determine the α values of the normalized H matrix. Generally speaking, block 110 of method 100 (FIG. 3) may be implemented using any suitable method for calculating these α values. Method 110 starts in block 202, where the $\alpha_1$ values are calculated for all of the possible non-ordered row combinations of n rows which include row 1 of the normalized H matrix. That is, all combinations of $\alpha_1|_{j,k,l,\ldots} = |a_{j1}|+|a_{k1}|+|a_{l1}|+\ldots$ for which j=1 and k, l ... $\in \{2, \ldots, m|k\neq l\neq \ldots\}$.

Method 110 then proceeds to block 204 which involves calculating the $\alpha_2$ values for all of the possible non-ordered row combinations of n rows which include row 1 of the normalized H matrix. That is, all combinations of $\alpha_2|_{j,k,l,\ldots} = |a_{j2}|+|a_{k2}|+|a_{l2}|+\ldots$ for which j=1 and k, l ... $\in \{2, \ldots, m|k\neq l\neq \ldots\}$. After block 204, method 110 continues to calculate the α values for the row 1 combinations in this manner, until it calculates the $\alpha_n$ values for the row 1 combinations in block 206. Block 206 involves calculating $\alpha_n|_{j,k,l,\ldots} = |a_{jn}|+|a_{kn}|+|a_{ln}|+\ldots$ for which j=1 and k, l, ... $\in \{2, \ldots, m|k\neq l\neq \ldots\}$. At the conclusion of block 206, method 110 has calculated all of the $\alpha_1, \alpha_2, \ldots \alpha_n$ (corresponding to columns 1, 2, ... n of the normalized H matrix) for all of the possible non-ordered combinations of n rows which include row 1 (i.e. the row 1 combinations).

Method 110 then proceeds to block 208 which involves calculating the $\alpha_1$ values for all of the remaining possible non-ordered row combinations of n rows which include row 2 of the normalized H matrix. The block 208 row combinations include row 2 but do not include row 1, as the $\alpha_1$ values for all possible row combinations of n rows that include row 1 were calculated in block 202. The $\alpha_1$ values calculated in block 208 include all combinations of $\alpha_1|_{j,k,l,\ldots} = |a_{j1}|+|a_{k1}|+|a_{l1}|+\ldots$ for which j=2 and k, l, ... $\in \{3, \ldots, m|k\neq l\neq \ldots\}$. Similarly, block 210 involves calculating the $\alpha_2$ values for the remaining possible row 2 combinations. The $\alpha_2$ values calculated in block 208 include all combinations of $\alpha_2|_{j,k,l,\ldots} = |a_{j2}|+|a_{k2}|+|a_{l2}|+\ldots$ for which j=2 and k, l, ... $\in \{3, \ldots, m|k\neq l\neq \ldots\}$. Method 110 continues to calculate the α values for the remaining row 2 combinations until block 212, which involves calculating the an values for all combinations of $\alpha_n|_{j,k,l,\ldots} = |a_{jn}|+|a_{kn}|+|a_{ln}|+\ldots$ for which j=2 and k, l, ... $\in \{3, \ldots, m|k\neq l\neq \ldots\}$. At the conclusion of block 212, method 110 has calculated (in blocks 208, 210 ... 212) all of the $\alpha_1, \alpha_2, \ldots \alpha_n$ (corresponding to columns 1, 2, ... n of the normalized H matrix) for all of the non-ordered combinations of n rows which include row 2 but do not include row 1.

It will be appreciated that the number of remaining row 2 combinations for blocks 208, 210, 212 is fewer that the number of row 1 combinations in blocks 202, 204, 206. Method 110 continues in this manner until it reaches row m−n+1 in block 214. When method 110 reaches row m−n+1, there is only one remaining combination of n rows for which the α values have not been calculated—i.e. the row combination m−n+1, m−n+2, ... m. Accordingly, block 214 involves the calculation of the $\alpha_1$ value given by $\alpha_1|_{j,k,l,\ldots} = |a_{j1}|+|a_{k1}|+|a_{l1}|+\ldots$ for which j=m−n+1, k=j+1, l=k+1 ..., block 216 involves the calculation of $\alpha_2|_{j,k,l,\ldots} = |a_{j2}|+|a_{k2}|+|a_{l2}|+\ldots$ for which j=m−n+1, k=j+1, l=k+1 ... and block 218 involves the calculation of $\alpha_n|_{j,k,l,\ldots} = |a_{jn}|+|a_{kn}|+|a_{ln}|+\ldots$ for which j=m−n+1, k=j+1, l=k+1 ...

At the conclusion of block 218, method 110 has calculated all of the $\alpha_1, \alpha_2, \ldots \alpha_n$ for all of the possible non-ordered combinations of n rows. Method 110 is therefore complete.

It will be appreciated that the number of α values calculated in block 110 (e.g. by method 110) is related to the values of m and n. It is well known in statistics that the numbered to non-ordered combinations of n elements (e.g. n rows) which may be selected from a group of m elements is given by $$\binom{m}{n} = \frac{m!}{n!(m-n)!}.$$

Therefore, in the illustrated embodiment, block 110 comprises determining $$\frac{m!}{n!(m-n)!} \alpha_1 \text{ values}, \frac{m!}{n!(m-n)!} \alpha_2$$

$$\text{values} \ldots \frac{m!}{n!(m-n)!} \alpha_n \text{ values for a total of}$$

$$\frac{nm!}{n!(m-n)!} = \frac{m!}{(n-1)!(m-n)!} \alpha \text{ values.}$$

Returning to method 100 of FIG. 3, after determining the α values in block 110, method 100 proceeds to block 115. Block 115 involves an inquiry into whether all of the α values determined in block 110 are less than unity. If any of the α values determined in block 110 are greater than or equal to unity (block 115 NO output), then method 100 proceeds to block 117, where the entire measurement equation is divided by a suitable factor of 10 before returning to block 110 to determine a new set of α values. In the illustrated embodiment, the loop of blocks 110, 115 and 117 continues until all of the m values of α are strictly less than unity. In this circumstance (block 115 YES output), method 100 proceeds to block 130.

In some embodiments, the block 115 inquiry may be performed after the calculation of each α value (or at some other suitable interval prior to completing the calculation of all of the α values). If any one α value is greater than or equal to unity (block 115 NO output), then the entire measurement equation is divided by a suitable factor of 10 (block 117). Performing the block 115 inquiry after the calculation of each α value (or at some other suitable interval prior to completion of calculation of all of the α values) may save computational resources in cases where an α value greater than or equal to unity is determined early, since method 100 will not proceed to block 130 unless all of the α values are strictly less than unity and therefore there is no point in calculating any further α values using the current measurement equation if any one of the α values is determined to be greater than or equal to unity.

Block 130 involves selecting n individual equations from among the set of m (or $m_1$) individual equations. The n individual equations are selected on the basis of the row combination for which $$\sum_{i=1}^{n} \alpha_i = \alpha_1 + \alpha_2 + \ldots \alpha_n$$

is the lowest. The quantity $$\sum_{i=1}^{n} \alpha_i = \alpha_1 + \alpha_2 + \ldots \alpha_n$$

for a particular row combination may be referred as the α sum for that row combination. In the illustrated embodiment, block 130 involves selecting the one row combination with the lowest α sum and then selecting the n individual equations corresponding to the rows of the row combination with the lowest α sum. By way of non-limiting example, the block 130 selection of n individual equations may involve summing the α values obtained in block 110

$$\left(\text{i.e. } \sum_{i=1}^{n} \alpha_i = \alpha_1 + \alpha_2 + \ldots \alpha_n\right)$$

for each row combination and then selecting the n individual equations corresponding to the row combination with the lowest α sum.

The result of the block 130 selection is a set of n individual equations. This set of n individual equations has 2n unknowns which include the corresponding parameters $x_1, x_2, \ldots, x_n$ of the state variable vector x and the corresponding values $v_1, v_2, \ldots, v_n$ of the disturbance vector v. However, on the basis of the Theorem described above, we assume that k=n and that the best LAV approximation $\underline{Hx}_{LAV}$ interpolates the n measurements selected in block 130. Accordingly, for the n equations selected in block 130, the corresponding values of the disturbance vector v are all zero. We therefore have reduced the set of equations selected in block 130 to a set of n individual equations with n unknowns (i.e. the corresponding parameters $x_1, x_2, \ldots, x_n$ of the state variable matrix x). The n equations selected in block 130 represent the n individual equations with the smallest contraction mapping constants (α values) in (9) and (14). These n equations provide the smallest error and therefore converge relatively rapidly when compared to the other (m−n) more slowly converging equations.

Block 135 involves explicitly solving the n equations selected in block 130 to determine the corresponding parameters $x_1, x_2, \ldots, x_n$ of x. The solution $x_1, x_2, \ldots, x_n$ of these n equations minimizes the LAV error or cost function in (3) since we have deliberately set the corresponding values of v equal to zero for the n equations selected in block 130. Accordingly, the cost function in (3) will always be the minimum value obtainable for measurement equation (1) whether it is linear or nonlinear. As described in more detail below, it may be desirable to iterate in the nonlinear case in order to obtain an optimal solution.

Example Applications for Unconstrained Optimization

Example 1

We assume that we obtain the following data values in block 102 from a system under consideration: (0.5,1,1), (1,1,2), (1.5,1,3), (2,1,4), (2.5,1,5), (1.5,1,15), (1.5,1,16). We assume that the first value in each ordered triplet is a measured variable (e.g. an output 16 which forms output vector z) and the second and third values in each ordered triplets are control variables (e.g. inputs 14 which form input matrix H). We assume further that we are trying to fit these data values to a polynomial (in this case a straight line) of the form $y=a_1x+a_2$. The polynomial $y=a_1x+a_2$ may represent the form of model referred to in block 56 of method 50 (FIG. 2)

In block 104, we construct the following measurement equation $$z - Hx = v = \begin{bmatrix} 0.5 \\ 1.0 \\ 1.5 \\ 2.0 \\ 2.5 \\ 1.5 \\ 1.5 \end{bmatrix} - \begin{bmatrix} 1 & 1 \\ 1 & 2 \\ 1 & 3 \\ 1 & 4 \\ 1 & 5 \\ 1 & 15 \\ 1 & 16 \end{bmatrix} \begin{bmatrix} a_2 \\ a_1 \end{bmatrix} = \begin{bmatrix} v_1 \\ v_2 \\ v_3 \\ v_4 \\ v_5 \\ v_6 \\ v_7 \end{bmatrix} \quad (15)$$

where $\underline{x}=[a_2,a_1]^T$. It is noted from (15) that m=7>n=2.

Block 106 involves an inquiry into whether any of the individual equations in (15) are identical. It can be observed that there are no identical equations in (15). Consequently, the block 106 inquiry is negative and method 100 proceeds to block 109. Block 109 involves normalizing (15) by dividing each of the individual equation in (15) by a suitable constant such that $\underline{z}=[z_1, z_2, \ldots, z_m]^T=[0.1, 0.1, \ldots, 0.1]^T$. The block 109 normalization yields $$\begin{bmatrix} .1 \\ .1 \\ .1 \\ .1 \\ .1 \\ .1 \\ .1 \end{bmatrix} - \begin{bmatrix} 1/5 & 1/5 \\ 1/10 & 2/10 \\ 1/15 & 3/15 \\ 1/20 & 4/20 \\ 1/25 & 5/25 \\ 1/15 & 15/15 \\ 1/15 & 16/15 \end{bmatrix} \begin{bmatrix} a_2 \\ a_1 \end{bmatrix} = \begin{bmatrix} v_1/5 \\ v_2/10 \\ v_3/15 \\ v_4/20 \\ v_5/25 \\ v_6/15 \\ v_7/15 \end{bmatrix} \quad (15')$$

Method 100 then proceeds to block 110, where we determine the $\alpha$ values of the normalized matrix $\overline{H}$ in the normalized measurement equation (15'). As discussed above, one technique for determining these $\alpha$ values is method 110 of FIG. 4. In the interest of brevity, we do not explicitly determine all of the $\alpha$ values here. However, it may be easily observed that $\alpha_2|_{6,7} = 15/15 + 16/15 > 1$.

Since $\alpha_2|_{6,7} > 1$ (i.e. there are one or more block 110 $\alpha$ values greater than or equal to unity), the block 115 inquiry is negative and method 100 proceeds to block 117. In block 117, we divide (15') by 10 to obtain $$\begin{bmatrix} .01 \\ .01 \\ .01 \\ .01 \\ .01 \\ .01 \\ .01 \end{bmatrix} - \begin{bmatrix} 1/50 & 1/50 \\ 1/100 & 2/100 \\ 1/150 & 3/150 \\ 1/200 & 4/200 \\ 1/250 & 5/250 \\ 1/150 & 15/150 \\ 1/150 & 16/150 \end{bmatrix} \begin{bmatrix} a_2 \\ a_1 \end{bmatrix} = \begin{bmatrix} v_1/50 \\ v_2/100 \\ v_3/150 \\ v_4/200 \\ v_5/250 \\ v_6/150 \\ v_7/150 \end{bmatrix} \quad (16)$$

Method 100 then proceeds to block 110 again, where we determine the $\alpha$ values for the revised equation (16). In this example, n=2 (i.e. there are two columns in the normalized $\overline{H}$ matrix. Consequently, there will be a $\alpha_1$ value and an $\alpha_2$ value for each combination of 2 rows. The $\alpha$ values calculated for the revised equation (16) are reproduced below.

$\alpha_1|_{1,2} = |a_{11}| + |a_{21}| = 1/50 + 1/100 = 0.03$; $\alpha_2|_{1,2} = |a_{12}| + |a_{22}| = 1/50 + 2/100 = 0.04$;

$\alpha_1|_{1,3} = |a_{11}| + |a_{31}| = 1/50 + 1/150 = 0.027$; $\alpha_2|_{1,3} = |a_{12}| + |a_{32}| = 1/50 + 3/150 = 0.04$;

$\alpha_1|_{1,4} = |a_{11}| + |a_{41}| = 1/50 + 1/200 = 0.025$; $\alpha_2|_{1,4} = |a_{12}| + |a_{42}| = 1/50 + 4/200 = 0.04$;

$\alpha_1|_{1,5} = |a_{11}| + |a_{51}| = 1/50 + 1/250 = 0.024$; $\alpha_2|_{1,5} = |a_{12}| + |a_{52}| = 1/50 + 5/250 = 0.04$;

$\alpha_1|_{1,6} = |a_{11}| + |a_{61}| = 1/50 + 1/150 = 0.027$; $\alpha_2|_{1,6} = |a_{12}| + |a_{62}| = 1/50 + 15/150 = 0.12$;

$\alpha_1|_{1,7} = |a_{11}| + |a_{71}| = 1/50 + 1/150 = 0.027$; $\alpha_2|_{1,7} = |a_{12}| + |a_{72}| = 1/50 + 16/150 = 0.127$;

$\alpha_1|_{2,3} = |a_{21}| + |a_{31}| = 1/100 + 1/150 = 0.017$; $\alpha_2|_{2,3} = |a_{22}| + |a_{32}| = 2/100 + 3/150 = 0.04$;

$\alpha_1|_{2,4} = |a_{21}| + |a_{41}| = 1/100 + 1/200 = 0.015$; $\alpha_2|_{2,4} = |a_{22}| + |a_{42}| = 2/100 + 4/200 = 0.04$;

$\alpha_1|_{2,5} = |a_{21}| + |a_{51}| = 1/100 + 1/250 = 0.014$; $\alpha_2|_{2,5} = |a_{22}| + |a_{52}| = 2/100 + 5/250 = 0.04$;

$\alpha_1|_{2,6} = |a_{21}| + |a_{61}| = 1/100 + 1/150 = 0.017$; $\alpha_2|_{2,6} = |a_{22}| + |a_{62}| = 2/100 + 15/150 = 0.12$;

$\alpha_1|_{2,7} = |a_{21}| + |a_{71}| = 1/100 + 1/150 = 0.017$; $\alpha_2|_{2,7} = |a_{22}| + |a_{72}| = 2/100 + 16/150 = 1.27$;

$\alpha_1|_{3,4} = |a_{31}| + |a_{41}| = 1/150 + 1/200 = 0.012$; $\alpha_2|_{3,4} = |a_{32}| + |a_{42}| = 3/150 + 4/200 = 0.04$;

$\alpha_1|_{3,5} = |a_{31}| + |a_{51}| = 1/150 + 1/200 = 0.011$; $\alpha_2|_{3,5} = |a_{32}| + |a_{52}| = 3/150 + 5/250 = 0.04$;

$\alpha_1|_{3,6} = |a_{31}| + |a_{61}| = 1/150 + 1/150 = 0.013$; $\alpha_2|_{3,6} = |a_{32}| + |a_{62}| = 3/150 + 15/150 = 0.12$;

$\alpha_1|_{3,7} = |a_{31}| + |a_{71}| = 1/150 + 1/150 = 0.013$; $\alpha_2|_{3,7} = |a_{32}| + |a_{72}| = 3/150 + 16/150 = 0.127$;

$\alpha_1|_{4,5} = |a_{41}| + |a_{51}| = 1/200 + 1/250 = 0.009$; $\alpha_2|_{4,5} = |a_{42}| + |a_{52}| = 4/200 + 5/250 = 0.04$;

$\alpha_1|_{4,6} = |a_{41}| + |a_{61}| = 1/200 + 1/150 = 0.012$; $\alpha_2|_{4,6} = |a_{42}| + |a_{62}| = 4/200 + 15/150 = 0.12$;

$\alpha_1|_{4,7} = |a_{41}| + |a_{71}| = 1/200 + 1/150 = 0.012$; $\alpha_2|_{4,7} = |a_{42}| + |a_{72}| = 5/250 + 16/150 = 0.127$;

$\alpha_1|_{5,6} = |a_{51}| + |a_{61}| = 1/250 + 1/150 = 0.011$; $\alpha_2|_{5,6} = |a_{52}| + |a_{62}| = 5/250 + 15/150 = 0.12$;

$\alpha_1|_{5,7} = |a_{51}| + |a_{71}| = 1/250 + 1/150 = 0.011$; $\alpha_2|_{5,7} = |a_{52}| + |a_{72}| = 5/250 + 16/150 = 0.127$;

$\alpha_1|_{6,7} = |a_{61}| + |a_{71}| = 1/150 + 1/150 = 0.013$; $\alpha_1|_{6,7} = |a_{62}| + |a_{72}| = 15/150 + 16/150 = 0.207$;

It can be seen that all of the $\alpha$ values for the revised $\overline{H}$ matrix are strictly less than unity. Accordingly, the block 115 inquiry is positive and method 100 proceeds to block 130.

Block 130 involves selecting the n equations corresponding to the row combination with the smallest $\alpha$ sum $$\left( \sum_{i=1}^{n} \alpha_i = \alpha_1 + \alpha_2 + \ldots \alpha_n \right).$$

In this particular Example, n=2. Consequently, block 130 involves selecting the n=2 individual equations corresponding to the row combination with the lowest $\alpha$ sum, where the $\alpha$ sums for a combination of rows j, k is determined according to $\alpha(\text{sum})|_{j,k} = \alpha_1|_{j,k} + \alpha_2|_{j,k}$. The $\alpha$ sums corresponding to equation (16) are given by:

$\alpha(\text{sum})|_{1,2} = \alpha_1|_{1,2} + \alpha_2|_{1,2} = 0.07$  $\alpha(\text{sum})|_{1,5} = 0.064$ $\alpha(\text{sum})|_{1,3} = 0.067$  $\alpha(\text{sum})|_{1,6} = 0.147$ $\alpha(\text{sum})|_{1,4} = 0.065$  $\alpha(\text{sum})|_{1,7} = 0.154$ $\alpha(\text{sum})|_{2,3} = 0.057$  $\alpha(\text{sum})|_{3,7} = 0.14$ $\alpha(\text{sum})|_{2,4} = 0.055$  $\alpha(\text{sum})|_{4,5} = 0.049$ $\alpha(\text{sum})|_{2,5} = 0.054$  $\alpha(\text{sum})|_{4,6} = 0.132$ $\alpha(\text{sum})|_{2,6} = 0.137$  $\alpha(\text{sum})|_{4,7} = 0.139$ $\alpha(\text{sum})|_{2,7} = 0.144$  $\alpha(\text{sum})|_{5,6} = 0.131$ $\alpha(\text{sum})|_{3,4} = 0.052$  $\alpha(\text{sum})|_{5,7} = 0.138$ $\alpha(\text{sum})|_{3,5} = 0.051$  $\alpha(\text{sum})|_{6,7} = 0.22$ $\alpha(\text{sum})|_{3,6} = 0.133$ It may be seen from the $\alpha$ sums calculated above that, in the case of system (16), the smallest $\alpha$ sum is $\alpha(\text{sum})|_{4,5} = \alpha_1|_4$, $_5+\alpha_2|_{4,5}=0.049$. Accordingly, in this particular example where n=2, block 130 involves selecting the $4^{th}$ and $5^{th}$ individual equations from system (16). As discussed above, this selection of individual equations minimizes the cost function in (3).

Block 135 involves assuming that $v_4=v_5=0$ and explicitly solving the $4^{th}$ and $5^{th}$ individual equations of (16)

$$\begin{bmatrix} .01 \\ .01 \end{bmatrix} - \begin{bmatrix} 1/200 & 4/200 \\ 1/250 & 5/250 \end{bmatrix} \begin{bmatrix} a_2 \\ a_1 \end{bmatrix} = \begin{bmatrix} 0 \\ 0 \end{bmatrix} \quad (17)$$

$$\text{Solving (17) yields } \begin{bmatrix} a_2 \\ a_1 \end{bmatrix} = \begin{bmatrix} 0 \\ 0.5 \end{bmatrix} \quad (18)$$

to provide a fitted curve of y=0.5x.

Here it is instructive to make a number of observations about the application of method 100 to this Example. Using (3), (15) and (18), we may compute the cost function J in (3) to be J=12.5. It can be observed that method 100 completely rejects the outlying data values corresponding to the $6^{th}$ and $7^{th}$ individual equations in (15). This can be shown by letting $z_6=7.5$ and $z_7=8.0$ (which are the "correct" values which fit a curve of the form y=0.5x) and reapplying method 100. In such a reapplication of method 100, the row combination with the smallest $\alpha$ sum is $\alpha(\text{sum})|_{6,7}=\alpha_1|_{6,7}+\alpha_2|_{6,7}$. Accordingly, in such a circumstance block 130 involves selecting the $6^{th}$ and $7^{th}$ individual equations and block 135 involves solving $$\begin{bmatrix} .01 \\ .01 \end{bmatrix} - \begin{bmatrix} 1/750 & 1/50 \\ 1/800 & 1/50 \end{bmatrix} \begin{bmatrix} a_2 \\ a_1 \end{bmatrix} = \begin{bmatrix} 0 \\ 0 \end{bmatrix} \quad (19)$$

$$\text{which again yields } \begin{bmatrix} a_2 \\ a_1 \end{bmatrix} = \begin{bmatrix} 0 \\ 0.5 \end{bmatrix} \quad (20)$$

This is the same solution that was obtained with the "erroneous" (e.g. outlying) data present. However, when we calculate the cost function (3) with the new data values, we observe that J=0. It follows that significant errors in the measurements can be detected by computing the cost function J in (3). It is also possible to detect errors in the model curve to be fitted.

Example 2

This Example is an economic problem taken from R. Ramanathan, Introductory Econometrics with Applications, Fourth Edition, Harcourt Brace Javanovich College Publishers, New York, 1992, pp. 141-142, which is hereby incorporated herein by reference and which is referred to hereinafter at "Ramanathan". This example refers to 57 sets of data for the cumulative cost of maintenance (excluding gasoline) and the number of miles driven (in thousands) for a vehicle. These 57 sets of data are obtained in block 102. The objective of method 100 in this Example is to fit the data to the following model cost=$a_1 x+a_2$ where x=miles (in thousands).

Block 104 involves using the 57 data values to generate a measurement equation. In this particular example, m=57 and n=2. Blocks 106 and 108 involve removing identical equations, if necessary.

Block 109 involves normalizing the 57 individual equations. In the interest of brevity, this calculation is not performed explicitly here. Block 110 involves determining the $\alpha$ values for the 57 individual equations. In one particular embodiment, this may be done in accordance with method 110 of FIG. 4. Again, in the interest of brevity, this calculation is not performed explicitly here. We then proceed through the loop of blocks 110, 115 and 117 until we have ensured that all of the $\alpha$ values are strictly less than 1.

As discussed above, block 130 involves selecting n individual equations corresponding to the row combination with the smallest $\alpha$ sum. In this Example, n=2 and the row combination with the smallest $\alpha$ sum is $\alpha(\text{sum})|_{44,47}=\alpha_1|_{44,47}+\alpha_2|_{44,47}$ where it may be observed that $$\alpha_1|_{44,47}=|a_{44,1}|+|a_{47,1}|=0.00395$$

$$\alpha_2|_{44,47}=|a_{44,2}|+|a_{47,2}|=0.0281$$

Accordingly, block 130 involves selecting the $44^{th}$ and $47^{th}$ individual equations.

Block 135 involves explicitly solving the system of n=2 selected equations (i.e. the $44^{th}$ and $47^{th}$ individual equations). It may be seen by reference to Ramanathan that the solution to the system of the $44^{th}$ and $47^{th}$ individual equations is $$\begin{bmatrix} a_2 \\ a_1 \end{bmatrix} = \begin{bmatrix} 301.909 \\ 55.7575 \end{bmatrix}$$

Accordingly, the fitted curve is given by $\text{Cost}_{LAV}=55.7575x-301.909$.

Once again, it is useful to make some observations relating to this Example. For the solution (22), the cost function (3) may be computed to be J=34,649.6. When a least squares estimate (LSE) is used to evaluate this problem, on this Example, the solution obtained is $\text{Cost}_{LSE}=53.788x-806.08$. It may be observed that the slopes of the curves fitted using method 100 and using a conventional LSE process are nearly equal.

When a conventional linear programming (LP) technique is used to generate a LAV estimate, the solution obtained is $\text{Cost}_{LAV/LP}=18.8x-138.68$. The cost function (3) evaluated with this LAV/LP solution yields J=44,661.1. It may be observed that the fitted curves obtained from the two LAV methods do not agree.

Example 3

Consider the normalized system $$z = \underline{H}x + \underline{v} = \begin{bmatrix} 0.1 \\ 0.1 \\ 0.1 \end{bmatrix} = \begin{bmatrix} 0.1 & 0.1 \\ 0.1 & 0.1 \\ .5 & 0.1 \end{bmatrix} \begin{bmatrix} x_1 \\ x_2 \end{bmatrix} + \underline{v} \quad (17)$$

By observation it can be seen that the first two individual equations in (17) are identical to one another. Accordingly, when applying method 100 to equation (17), the block 106 inquiry would be positive and method 100 would proceed to block 108. In block 108, only one of the individual equations 1 and 2 would be retained. If one of these equations is removed, then equation (17) becomes $$z = \underline{H}x + \underline{v} = \begin{bmatrix} 0.1 \\ 0.1 \end{bmatrix} = \begin{bmatrix} 0.1 & 0.1 \\ 0.5 & 0.1 \end{bmatrix} \begin{bmatrix} x_1 \\ x_2 \end{bmatrix} + \underline{v} \quad (17')$$

which actually is a system of 2 equations in 2 unknowns and therefore has a unique solution (i.e. it is not necessary (although it is possible) to continue with method 100).

Example 4

Consider the following normalized system $$\begin{bmatrix} 0.1 \\ 0.1 \\ 0 \end{bmatrix} = \begin{bmatrix} 0.1 & 0.1 \\ 0.2 & 0.3 \\ .5 & 0.1 \end{bmatrix} \begin{bmatrix} x_1 \\ x_2 \end{bmatrix} + \underline{v} \quad (18)$$

It is observed that $z_3=0$. This represents an interesting circumstance, because the third individual equation can be made arbitrarily small by dividing it by any suitable constant. In this case, the row combination with the smallest $\alpha$ sum will always include the third row. Accordingly, the $3^{rd}$ individual equation in (18) will always be one of the n=2 equations selected in block 130.

Particular Embodiment for Optimization Under Linear Constraints

Figure 5:
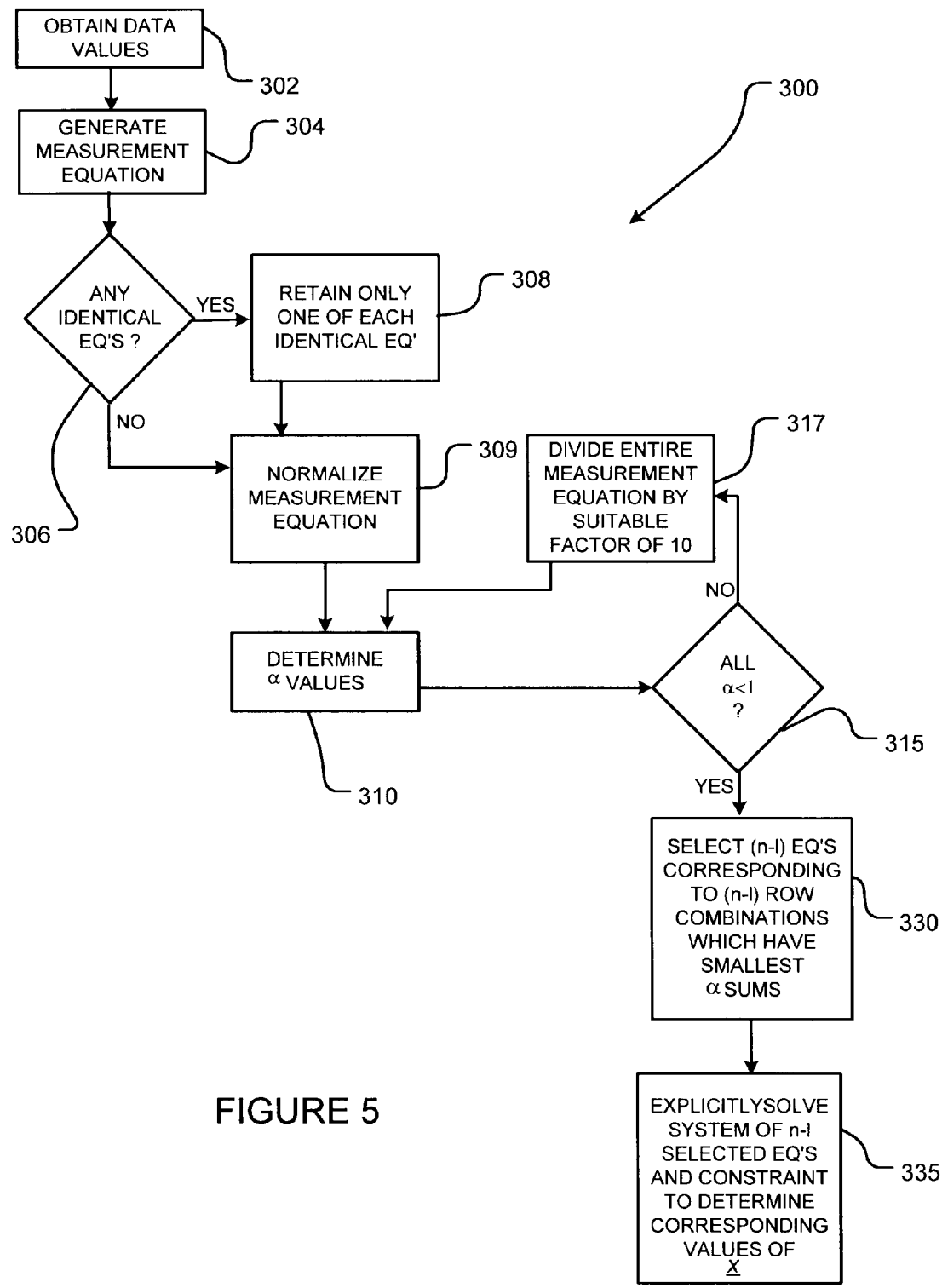
FIG. 5 shows a method for optimizing a curve/model to a set of data values according to a particular embodiment of the invention where the curve/model is constrained by particular constraint criteria.

FIG. 5 illustrates a method 300 for optimizing the measurement equation (1)

$$\underline{z} = H\underline{x} + \underline{v} \quad (1)$$

subject to a constraint of the form $$C\underline{x} = \underline{d} \quad (19)$$

where C is a l×n matrix (l<n) and d is a l×1 vector. It will be appreciated that constraint (19) actually comprises l individual equations. Constraint (19) may be the constraint obtained in block 58 of method 50 (FIG. 2). By way of non-limiting example, method 300 may be performed as a part of block 60 of method 50 (FIG. 2).

In many respects, method 300 is similar to method 100 and blocks of method 300 corresponding to similar blocks of method 100 are preceded by the numeral "3" rather than "1". Method 300 differs from method 100 in that constraint (19) must be satisfied exactly. In general, constraint (19) is an order-l constraint. Accordingly, we may only select n–l individual equations from the measurement equation (1) to be interpolated by the best LAV approximation $Hx_{LAV}$. This aspect of method 300 is explained in more detail below.

Blocks 302, 304, 306, 308 and 309 of method 300 are substantially similar to blocks 102, 104, 106, 108 and 109 of method 100. The block 310 calculation of $\alpha$ values differs from the calculation of $\alpha$ values in block 110. In block 110, each $\alpha$ value is determined by a sum of the elements of the normalized H matrix from a particular column and from a row combination of n rows. In block 310, however, each $\alpha$ value is determined by a sum of the elements of the normalized H matrix from a particular column and from a row combination of n–l rows. This reduced number of row combinations is used to accommodate the constraints (19).

Blocks 315 and 317 are substantially similar to corresponding blocks 115, 117 of method 100. Block 330 of method 300 differs from block 130 of method 100 in that block 330 involves selection of the n–l individual equations from within measurement equation (1) which correspond to the row combination with the smallest $\alpha$ sum. The block 330 $\alpha$ sums may be determined using substantially the same procedure as discussed above for block 130. However, rather than selecting n individual equations corresponding to the row combination with the smallest $\alpha$ sum as was done in 130, block 330 involves selecting n–l individual equations corresponding to the row combination with the smallest $\alpha$ sum.

Block 335 involves forming a system of n equations in n unknowns using the n–l individual equations selected in block 330 together with the l equations from the constraint (19). As with block 135 of method 100, we assume that the n–l individual equations selected in block 330 are interpolated by the LAV approximation $Hx_{LAV}$. The explicit solution to the block 335 system of n equations in n unknowns provides the individual elements of $\underline{x}$ in (1). The block 335 solution minimizes the LAV cost function (3) subject to constraints (19), since we have deliberately set the corresponding values of v equal to zero for the n–l equations selected in block 330 and for the constraints (19).

Example Application of Optimization Under Linear Constraints

Example 5

Here we revisit the data values of Example 1 and we are trying to fit the curve $y=a_1 x+a_2$. However, we now make out solution subject to the constraint that $y(10)=4.5$. We may express this constraint in the form of equation (19)

$$C\underline{x} = \underline{d} = [1\ 10]\begin{bmatrix} a_2 \\ a_1 \end{bmatrix} = 4.5 \quad (20)$$

It is observed that l=1 for constraint (20).

Method 300 proceeds through blocks 302, 304, 306 and 309 in manner similar to blocks 102, 104, 106, 109 discussed above for Example 1. When method 300 arrives in block 310 for the first time, the $\alpha$ values are calculated on the basis of equation (15'). However, in block 310, the $\alpha$ values are calculated using the elements from a particular column and from a row combination of n–l=2–1=1 row. For the sake of brevity, we do not perform this calculation here. However, it is observed that $$\alpha_1|_6 = |a_{62}| = 1$$

and $$\alpha_1|_7 = |a_{72}| = 16/15$$

Accordingly, the block 315 inquiry is negative and method 300 loops through block 317 where the measurement equation (15') is divided by 10 to obtain the measurement equation (16). Method 300 then returns to block 310, where the $\alpha$ values are calculated again. The $\alpha$ values calculated in block 310 are:

$$\alpha_1|_1 = |a_{11}| = 1/50 = 0.02;\ \alpha_2|_1 = |a_{12}| = 1/50 = 0.02;$$

$$\alpha_1|_2 = |a_{21}| = 1/100 = 0.01;\ \alpha_2|_2 = |a_{22}| = 2/100 = 0.02;$$

$$\alpha_1|_3 = |a_{31}| = 1/150 = 0.007;\ \alpha_2|_3 = |a_{32}| = 3/150 = 0.02;$$

$$\alpha_1|_4 = |a_{41}| = 1/200 = 0.005;\ \alpha_2|_4 = |a_{42}| = 4/200 = 0.02;$$

$$\alpha_1|_5 = |a_{51}| = 1/250 = 0.004;\ \alpha_2|_5 = |a_{52}| = 5/250 = 0.02;$$

$$\alpha_1|_6 = |a_{61}| = 1/150 = 0.007;\ \alpha_2|_6 = |a_{62}| = 15/150 = 0.1;$$

$$\alpha_1|_7 = |a_{71}| = 1/150 = 0.007;\ \alpha_2|_7 = |a_{72}| = 16/150 = 0.107;$$

Since all the $\alpha$ values are less than unity, the block 315 inquiry is positive and method 300 proceeds to block 330. Block 330 involves selecting the n–l=2–1=1 equation corresponding to the row combination with the lowest α sum. In this Example, the row "combinations" are only single rows and the single row with the lowest α sum is the $5^{th}$ row which can be observed to have an α sum of $\alpha(\text{sum})|_5 = \alpha_1|_5 + \alpha_2|_5 = 0.024$. Accordingly, in this Example, the individual equation of the $5^{th}$ row is selected in block 330.

In block 335, we form a system of equations using the constraint (20) and the individual equation(s) selected in block 330 (i.e. the equation corresponding to the $5^{th}$ row of (16)) under the assumption that vi in (1) is zero for the individual equation(s) selected in block 130. For this Example, the resultant system is given by:

$$\begin{bmatrix} 1 & 10 \\ 1/250 & 5/250 \end{bmatrix} \begin{bmatrix} a_2 \\ a_1 \end{bmatrix} = \begin{bmatrix} 4.5 \\ .01 \end{bmatrix} \quad (21)$$

which may be solved to yield $$\begin{bmatrix} a_2 \\ a_1 \end{bmatrix} = \begin{bmatrix} .5 \\ .4 \end{bmatrix}.$$

This solution, which corresponds to $y = 0.4x + 0.5$, differs from the solution calculated in Example 1. However, this solution minimizes the cost function (3) subject to the constraint (20).

Non-Linear Optimization

In other embodiments, methods similar to those discussed above may be applied to non-linear measurement equations of the form $$\underline{z} = f(\underline{a}, \underline{x}) + \underline{v} \quad (22)$$

where z represents an m×1 measurement vector (e.g. from output 16 (FIG. 1)), x is an n×1 vector representing the parameters $x_1, x_2, \ldots, x_n$ of the curve/model (e.g. model 26 of system 12 (FIG. 1)) where m>n, a represents the explanatory variables (e.g. from inputs 14 (FIG. 1)) and v represents the measurement error. Measurement equation (22) may be expressed in component form as $$z_i = f_i(a_i, \underline{x}) + v_i \, i = 1, 2 \ldots m \quad (23)$$

In the non-linear case (22), the LAV cost function is given by $$J = \sum_{i=1}^{m} |z_i - f_i(a_i, x)| = \sum_{i=1}^{m} |v_i| \quad (24)$$

We also impose a constraint (expressed in component form)

$$g_i(a_i, \underline{x}) = 0 \quad (25)$$

Constraint (25) may be the constraint obtained in block 58 of method 50 (FIG. 2), for example.

We may linearize the component form measurement equation (23) by first order Taylor series expansion about an initial estimate $\underline{x}_o$ to provide $$z_i = f_i(a_i, \underline{x}_o) + v_i + \frac{\partial f_i(a_i, \underline{x})}{\partial \underline{x}} \bigg|_{\underline{x} = \underline{x}_o} (\underline{x} - \underline{x}_o) \quad (26)$$

We can then define the following $$\Delta \underline{x} = (\underline{x} - \underline{x}_o) \quad (27)$$

$$\Delta z_i = z_i - f_i(a_i, \underline{x}_o) \text{ for } i = 1, 2, \ldots m \quad (28)$$

$$H_i = \frac{\partial f_i(a_i, \underline{x})}{\partial \underline{x}} \bigg|_{\underline{x} = \underline{x}_o} \text{ for } i = 1, 2, \ldots m \quad (29)$$

and rewrite equation (26) as $$\Delta z_i = \underline{H}_i \Delta \underline{x} + v_i \text{ for } i = 1, 2, \ldots m \quad (30)$$

or, in complete matrix/vector form, $$\Delta \underline{z} = \underline{H} \Delta \underline{x} + \underline{v} \quad (31)$$

In a similar manner, the constraint (25) may be linearized by Taylor series expansion to provide $$\underline{C}_i \Delta \underline{x} = d_i \text{ for } i = 1, 2, \ldots l \quad (32)$$

or, in complete matrix/vector form, $$\underline{C} \Delta \underline{x} = \underline{d} \quad (33)$$

where $$\underline{C}_i = \frac{\partial g_i(a_i, \underline{x})}{\partial \underline{x}} \bigg|_{\underline{x} = \underline{x}_o} \text{ for } i = 1, 2, \ldots l \quad (34)$$

$$d_i = -g_i(a_i, \underline{x}_o) \text{ for } i = 1, 2, \ldots l \quad (35)$$

Examining (31) and (33)

$$\Delta \underline{z} = \underline{H} \Delta \underline{x} + \underline{v} \quad (31)$$

$$\underline{C} \Delta \underline{x} = \underline{d} \quad (33)$$

it may be recognized that these equations have the same form as the optimization under linear constraints presented above in equations (1) and (19), except that z and x of equations (1) and (19) are replaced by $\Delta z$ and $\Delta x$ in equations (31) and (33).

Equations (31) and (33) may therefore be optimized according to the procedure presented above for optimization under linear constraints to yield a solution $\Delta x$. The original estimated solution $x_o$ may then be iterated by increments of $\Delta x$ of to solve the original non-linear problem posed by equations (23) and (25). More particularly, the $(i+1)^{th}$ iterate is given by $$\underline{x}_{i+1} = \underline{x}_i + \Delta \underline{x}_i \text{ where } i = \text{iteration counter} \quad (36)$$

The iteration continues until $\Delta x_i$ is sufficiently small to meet applicable acceptance criteria. For example, the iteration may continue until $$\Delta \underline{x}_i < \theta \quad (37)$$

where θ represents an iteration threshold. In some embodiment, iteration criteria may comprise other thresholds. By way of non-limiting example, iteration criteria may be based on threshold value of the cost function (24), a number of iterations or the like.

Figure 6:
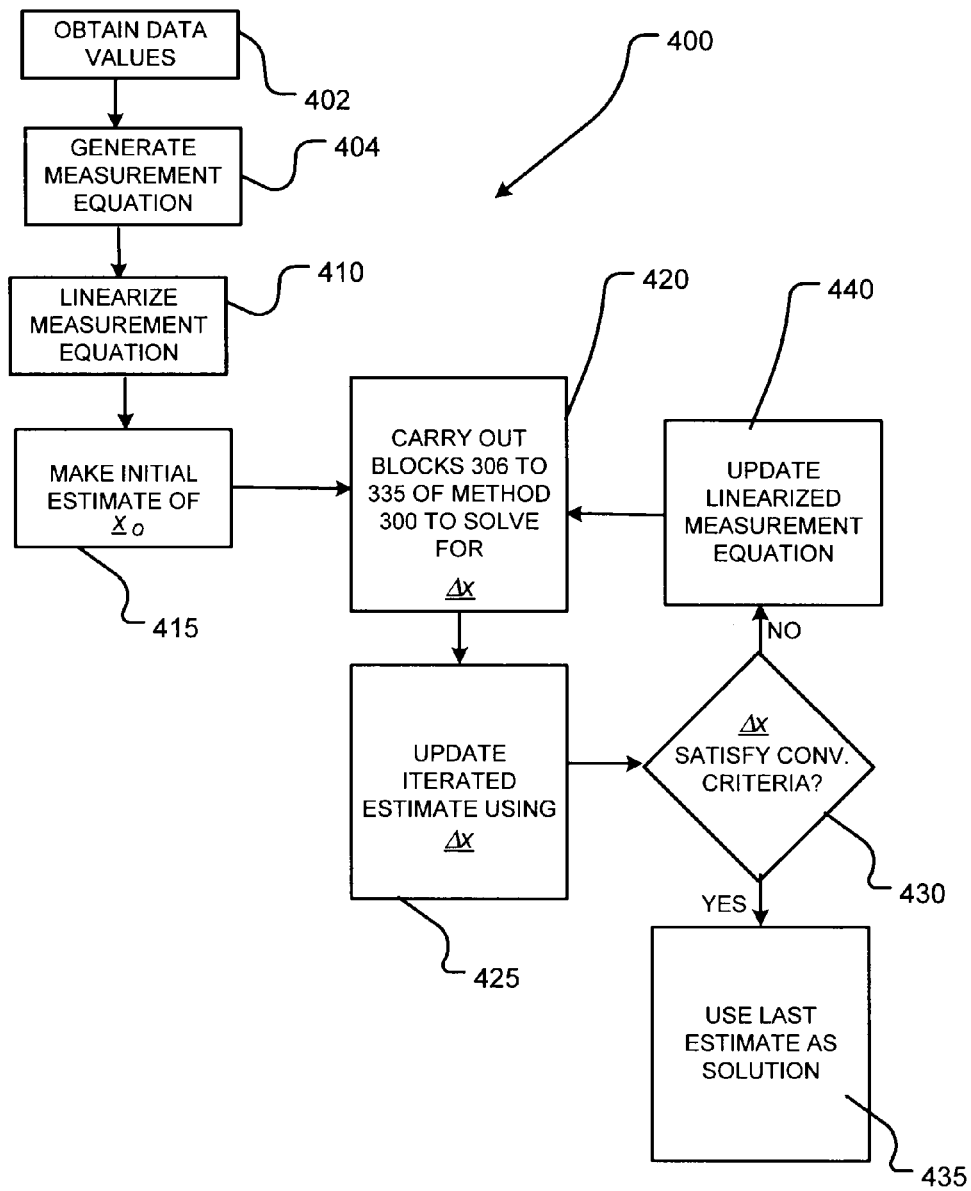
FIG. 6 shows a method for optimizing a non-linear curve/model to a set of data values according to a particular embodiment of the invention.

FIG. 6 represents a method 400 for optimizing a non-linear system according to a particular embodiment of the invention. By way of non-limiting example, method 400 may be implemented in block 60 of method 50 (FIG. 2). Method 400 commences in block 402. Block 402 involves obtaining data values (e.g. from inputs 14 and outputs 16) and is similar to block 102 of method 100 discussed above. Block 404 involves using the block 402 data values to generate a non-linear measurement equation of the form of (23) and a constraint equation of the form of (25).

Method 400 then proceeds to block 410 which involves linearizing the block 404 measurement and constraint equations in the manner described above to arrive at a linear optimization problem in $\Delta \underline{x}$—i.e. in the form described above in equations (31) and (33). Method 400 then proceeds to block 415 which involves making an initial estimate of the value of $\underline{x}$ in the block 404 measurement equation. In some applications, there may be some basis on which to form the estimate of the parameters $x_1, x_2, \ldots x_n$, such as past experiment, knowledge of system 12 under consideration or the like. Block 415 typically involves substituting the initial estimate into the block 410 linearized measurement and constraint equations to arrive at estimated linearized measurement and constraint equations.

Method 400 then proceeds to block 420. Block 420 involves carrying out the steps of blocks 306 to 335 of method 300 on the estimated linearized measurement and constraint equations from block 415. The application of blocks 306 to 335 may be substantially similar to the application discussed above and the result of block 420 is to determine a value for $\Delta \underline{x}$ based on the estimated linearized measurement and constraint equations from block 415. In block 425, the block 420 $\Delta \underline{x}$ value is used to update the iterated estimate of $\underline{x}$ according to equation (36).

Block 430 involves an inquiry as to whether the block 420 $\Delta \underline{x}$ satisfies suitably selected convergence criteria. If the block 420 $\Delta \underline{x}$ satisfies the convergence criteria (block 430 YES output), then method 400 proceeds to block 435 where the block 425 estimate of $\underline{x}$ is provided as the final estimate of $\underline{x}$—e.g. the parameters $x_1, x_2, \ldots, x_n$ of model 26 (FIG. 1). If the block 420 $\Delta \underline{x}$ does not satisfy the convergence criteria (block 430 NO output), then method 400 proceeds to block 440 where the linearized measurement and conversion equations are updated with the new estimate of $\underline{x}$ (i.e. as updated in block 425) before looping back to block 420, where a new $\Delta \underline{x}$ value is obtained. Method 400 loops through blocks 420, 425, 430 and 440 until the block 430 convergence criteria are satisfied. Typically the block 430 convergence criteria include threshold conditions relating to one or more parameters, such as $\Delta \underline{x}$, the LAV cost function (24), the number of iterations or the like must be less than the threshold.

Figure 7:
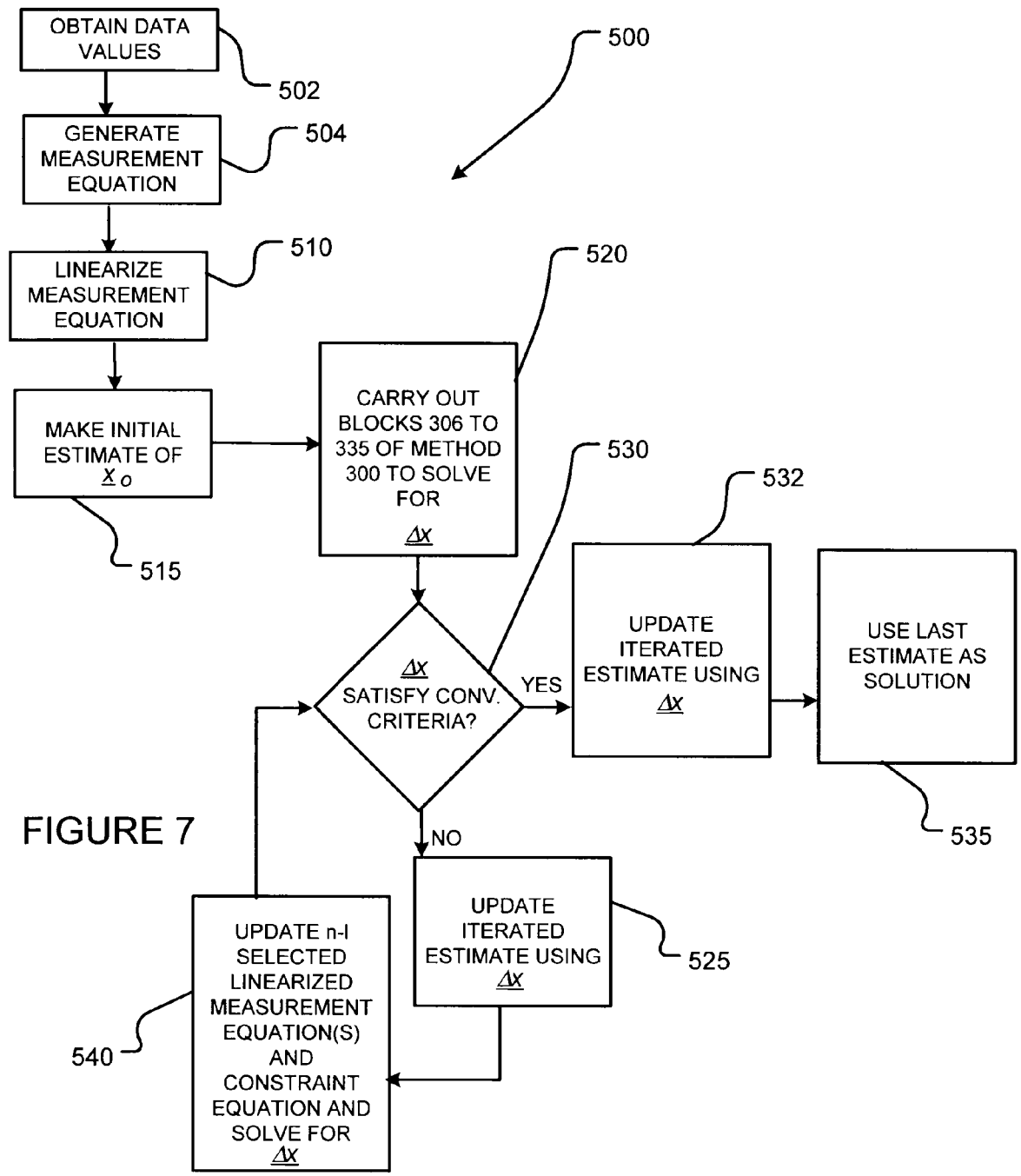
FIG. 7 shows a method for optimizing a non-linear curve/model to a set of data values according to another embodiment of the invention.

FIG. 7 schematically depicts a method 500 for optimizing a non-linear system according to another embodiment of the invention. By way of non-limiting example, method 500 may be implemented in block 60 of method 50 (FIG. 2). Method 500 is similar in many respects of method 400 and blocks of method 500 corresponding to similar blocks of method 400 are preceded by the numeral "5" rather than "4". Blocks 502, 504, 510, 515 and 520 of method 500 are substantially similar to corresponding blocks 402, 404, 410, 415 and 420 of method 400.

Method 500 differs from method 400 in that, after the first iteration, method 500 proceeds on the assumption that the n–l individual equations selected in block 520 (more particularly, in the block 330 aspect of block 520) will be the n–l selected equations throughout the iteration. Method 500 can therefore save computational resources by only recalculating necessary components of the measurement equation and convergence criteria for each iteration. This aspect of method 500 is explained in more detail below.

After determining a first a new $\Delta \underline{x}$ in block 520, method 500 proceeds to the block 530 inquiry as to whether the block 520 $\Delta \underline{x}$ values satisfy suitably selected convergence criteria. The block 530 inquiry is substantially similar to the block 430 inquiry described above. If the block 530 convergence criteria are not satisfied (block 530 NO output), then method 500 proceeds to block 525. Block 525 is substantially similar to block 425 of method 400 and involves updating the iterated estimate of $\underline{x}$ according to equation (36) using the $\Delta \underline{x}$ obtained in the previous iteration.

Method 500 then proceeds to block 540. Block 540 involves using the updated iterated estimate of $\underline{x}$ from block 525 to update the n–l individual linearized measurement equations selected in block 520 (more particularly, in the block 330 aspect of block 520). Method 500 assumes that the n–l individual linearized measurement equations selected in block 520 (i.e. in the first iteration) will be the same in each iteration. Consequently, it is not necessary to update the m–(n–l) other, non-selected individual equations in the linearized measurement equation for the second and subsequent iterations. This aspect of method 500 conserves computational resources. Block 540 also involves using the updated iterated estimate of $\underline{x}$ from block 525 to update the l individual linearized constraint equations.

The result of updating the n–l individual linearized measurement equations and the l individual linearized constraint equations with the new updated iterated estimate of $\underline{x}$ from block 425 is a system of n equations in n unknowns $\Delta x_1, \Delta x_2, \ldots \Delta x_n$. Block 540 also involves solving this system of equations to arrive at a new value for $\Delta \underline{x}$. Method 500 then returns to the block 530 inquiry to determine whether the block 540 values of $\Delta \underline{x}$ satisfy the convergence criteria. Method 500 continues to loop through blocks 530, 525 and 540 until the convergence criteria are satisfied in block 530.

When the block 530 convergence criteria are satisfied (block 530 YES output), method 500 proceeds to block 532. Block 532 is similar to block 525 and involves updating the iterated estimate of $\underline{x}$ according to equation (36) using the $\Delta \underline{x}$ obtained in the previous iteration. In block 535, the block 532 value of $\underline{x}$ is presented as the final estimated solution—e.g. the parameters $x_1, x_2, \ldots, x_n$, of model 26 (FIG. 1).

Example Application of Non-Linear Optimization

Example 6

We consider the non-linear relations $$f_1(\underline{x}) = f_1(x_1, x_2) = x_1^2 + x_2 - 10$$

$$f_2(\underline{x}) = f_2(x_1, x_2) = x_1 + x_2^2 - 7 \tag{38}$$

and we desire to minimize $F(\underline{x}) = |f_1(\underline{x})| + |f_2(\underline{x})|$ \hfill (39)

subject to the constraint $g_1(x_1, x_2) = x_1^2 - x_2^3 - 1 = 0$ \hfill (40)

In block 404, we use (38) to generate a measurement equation of the form of equation (23)

$$z_1 = f_1(\underline{x}) + v_1 = f_1(x_1, x_2) + v_1 = x_1^2 + x_2 - 10 + v_1$$

$$z_2 = f_2(\underline{x}) + v_2 = f_2(x_1, x_2) + v_2 = x_1 + x_2^2 - 7 + v_2 \tag{41}$$

Comparing (39) to the general cost function (24) described above, it may be seen that minimizing (39) is equivalent to minimizing the general cost function (24) when $z_i = 0$. Accordingly, in block 410, we set $z_i = 0$ in the measurement equation (41) and then linearize the resultant equations according to the procedure described above in equations (27), (28), (29) and (31). This linearization process yields $$\Delta \underline{z} = \underline{H} \Delta \underline{x} + \underline{v} \tag{42}$$

where $$\Delta z = \begin{bmatrix} -(x_1^2 + x_2 - 10) \\ -(x_1 + x_2^2 - 7) \end{bmatrix} \quad (43)$$

$$H = \begin{bmatrix} 2x_1 & 1 \\ 1 & 2x_2 \end{bmatrix} \quad (44)$$

$$\Delta \underline{x} = \begin{bmatrix} \Delta x_1 \\ \Delta x_2 \end{bmatrix} \quad (45)$$

Block 410 also involves linearizing the constraint (40) using the process described above in equations (33), (34) and (35) to obtain $$\underline{C}\Delta \underline{x} = \underline{d} \quad (46)$$

where $$\underline{C} = \lfloor 2x_1 - 3x_2^2 \rfloor \quad (47)$$

$$\underline{d} = [-(x_1^2 - x_2^3 - 1)] \quad (48)$$

Block 415 involves making an initial estimate of $\underline{x}_o$. In this Example, we assume $$\underline{x}_0 = \begin{bmatrix} x_{1_o} \\ x_{2_o} \end{bmatrix} = \begin{bmatrix} 1 \\ 1 \end{bmatrix}$$

and substituting these $\underline{x}_o$ values into the linearized equations (42)-(48). Upon substituting the $\underline{x}_o$ estimate, equation (42) becomes $$\Delta z = H \Delta \underline{x} + \underline{v} = \begin{bmatrix} 8 \\ 5 \end{bmatrix} = \begin{bmatrix} 2 & 1 \\ 1 & 2 \end{bmatrix} \begin{bmatrix} \Delta x_1 \\ \Delta x_2 \end{bmatrix} + \underline{v} \quad (49)$$

and equation (46) becomes $$\underline{C}\Delta \underline{x} = \underline{d} = [2 \quad -3] \begin{bmatrix} \Delta x_1 \\ \Delta x_2 \end{bmatrix} = 1 \quad (50)$$

Method 400 then proceeds to block 420 which involves using the procedures outlined in blocks 306 to 335 of method 300 to solve for $$\Delta \underline{x} = \begin{bmatrix} \Delta x_1 \\ \Delta x_2 \end{bmatrix}.$$

For the sake of brevity, we do not describe all of the individual blocks of method 300. However, it may be seen that, once normalized, equation (49) becomes $$\Delta z = H \Delta \underline{x} + \underline{v} = \begin{bmatrix} .1 \\ .1 \end{bmatrix} = \begin{bmatrix} .025 & .0125 \\ .02 & .04 \end{bmatrix} \begin{bmatrix} \Delta x_1 \\ \Delta x_2 \end{bmatrix} + \underline{v} \quad (51)$$

The α values for (51) include row combinations of n−1 rows. In this case, n−1=2−1=1 (i.e. row "combinations" of a single row). The α values and may be calculated as $\alpha_1 \uparrow_1 = |a_{11}| = 0.025; \alpha_2|_1 = |a_{12}| = 0.0125;$ $\alpha_1|_2 = |a_{21}| = 0.02; \alpha_2|_2 = |a_{22}| = 0.04;$ The lowest α sum is $\alpha(sum)|_1 = \alpha_1|_1 + \alpha_2|_1 = 0.0375$. We therefore select the first individual equation from (51) together with the constraint (50) to develop a system of n=2 equations in n=2 unknowns which is given by $$\begin{bmatrix} .025 & .0125 \\ 2 & -3 \end{bmatrix} \begin{bmatrix} \Delta x_1 \\ \Delta x_2 \end{bmatrix} = \begin{bmatrix} .1 \\ 1 \end{bmatrix} \quad (52)$$

$$\text{which yields} \begin{bmatrix} \Delta x_1 \\ \Delta x_2 \end{bmatrix} = \begin{bmatrix} 3.125 \\ 1.75 \end{bmatrix} \quad (53)$$

Method 400 then proceeds to block 425 which involves updating the iterated estimate according to equation (36). In this case $$\begin{bmatrix} x_1 \\ x_2 \end{bmatrix}_1 = \begin{bmatrix} x_1 \\ x_2 \end{bmatrix}_0 + \begin{bmatrix} \Delta x_1 \\ \Delta x_2 \end{bmatrix} = \begin{bmatrix} 1 \\ 1 \end{bmatrix} + \begin{bmatrix} 3.125 \\ 1.75 \end{bmatrix} = \begin{bmatrix} 4.125 \\ 2.75 \end{bmatrix} \quad (54)$$

In block 430, method considers whether or not the convergence criteria are met. In this particular Example, a non-limiting example of a suitable convergence criteria may be $\Delta x_1, \Delta x_2 < 0.05$. Since this convergence criteria is not satisfied (block 430 NO output), method 400 proceeds to block 440. Block 440 involves updating the linearized equations (42)-(48) with the new x estimate from (54).

Method 400 then loops back to block 420 for a subsequent iteration. The iterations of blocks 420, 425, 430, 440 are repeated until the convergence criteria are met in block 430. For the sake of brevity, the $2^{nd}$ and subsequent iterations are not explicitly calculated here. Others have shown (using different techniques) that this problem converges to approximately $$\begin{bmatrix} x_1 \\ x_2 \end{bmatrix} = \begin{bmatrix} 2.8425 \\ 1.9202 \end{bmatrix}.$$

Other Considerations

Certain implementations of the invention comprise computer processors which execute software instructions which cause the processors to perform a method of the invention. The invention may also be provided in the form of a program product. The program product may comprise any medium which carries a set of computer-readable instructions which, when executed by a data processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The program product may also comprise data, databases or other information which may be accessible to, but not necessarily executed by, a processor.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The methods described above and shown in the associated Figures represent particular embodiments of the invention. It will be appreciated that the procedures associated with various blocks may be performed in different orders than the one shown herein. By way of non-limiting example, in method 50 (FIG. 2), the model to be considered (block 56) and/or the constraints to be considered (block 58) may be obtained prior to obtaining inputs and outputs (blocks 52, 54). In addition, the temporal performance of the procedures associated with various blocks may overlap. By way of non-limiting example, in method 100 (FIG. 3) and similar methods, it may be possible to check if α values are strictly less than unity (block 115) at a time that overlaps with determination of the α values (block 110). Such a temporal overlap may be desirable because if it is discovered that any one α value is greater than or equal to unity, then it may not be necessary to compute further α values.

Once a model characterized by a n×1 parameter vector $\underline{x}=[x_1, x_2, \ldots x_n]^T$ is obtained using one of the methods described herein, the model may be used to predict outputs 16 of system 12 under consideration based on a known set of inputs 14.

As such, the invention should be interpreted in accordance with the claims appended hereto.

Appendix A

Under what conditions is the mapping $\underline{\underline{A}}$ a contraction when it is defined by $\underline{\underline{A}}\underline{x}=\underline{x}$? Then the following condition is derived.

$$\text{Let } d(\underline{x}, \underline{y}) = \sum_{i=1}^{n} |x_i - y_i| \text{ then}$$

$$d(\underline{y}', \underline{y}'') = \sum_i |y_i' - y_i''|$$

$$= \sum_i \left| \sum_j a_{ij}(x_j' - x_j'') \right| \le \sum_i \sum_j |a_{ij}||x_j' - x_j''|$$

$\le \max_j \Sigma_i |a_{ij}| d(\underline{x}', \underline{x}'')$ Hence we have the following condition for contraction:

$\Sigma_i |a_{ij}| \le \alpha < 1$.

What is claimed is:

1. A method for fitting a model to a set of data, implemented by a computer system comprising a processor and memory storing instructions which, when executed by the processor, cause the processor to perform the method, the method comprising:

providing a model characterized by a n×1 parameter vector $\underline{x}=[x_1, x_2, \ldots x_n]^T$ having n individual parameters $x_1, x_2, \ldots x_n$;

obtaining m sets of data from a system under consideration where m>n;

constructing a measurement equation of a form $\underline{z}=\underline{\underline{H}}\underline{x}+\underline{v}$ based on the m sets of data and the parameter vector $\underline{x}$, wherein each one of the m sets of data is used to construct $z_i$ and $\underline{H}_i$ of a corresponding row $z_i=\underline{H}_i\underline{x}+v_i$ of the measurement equation and $\underline{v}$ represents a m×1 disturbance vector $\underline{v}=[v_1, v_2, \ldots v_m]^T$;

for each column of the matrix $\underline{\underline{H}}$, determining a set of α values wherein each α value is based on a corresponding subset of elements of the column of the matrix $\underline{\underline{H}}$, the subset of elements determined on the basis of a distinct, non-ordered combination of rows of the matrix $\underline{\underline{H}}$;

for each distinct, non-ordered row combination of the matrix $\underline{\underline{H}}$, determining a corresponding α sum by adding the α values associated with the row combination for each column of the matrix $\underline{\underline{H}}$; and selecting a row combination with a lowest α sum and forming a reduced set of equations based, at least in part, on the rows $z_i=\underline{H}_i\underline{x}+v_i$ of the measurement equation corresponding to the row combination with the lowest α sum and wherein corresponding values of the disturbance vector $\underline{v}$ for the reduced set of equations are set to zero;

solving the reduced set of equations for the individual parameters $x_1, x_2, \ldots x_n$ of the parameter vector $\underline{x}=[x_1, x_2, \ldots x_n]^T$ to thereby characterize the model; and, outputting a characterization of the model.

2. A method according to claim 1 wherein obtaining the m sets of data from the system under consideration comprises applying m sets of known inputs to the system and, for each set of inputs, determining a corresponding output of the system.

3. A method according to claim 2 wherein determining the corresponding output of the system comprises measuring the corresponding output using a measurement apparatus.

4. A method according to claim 1 wherein, for each column of the matrix $\underline{\underline{H}}$, determining the set of α values wherein each α value is based on the corresponding subset of elements of the column of the matrix $\underline{\underline{H}}$ comprises, for each α value, summing the absolute values of the corresponding subset of elements of the column of the matrix $\underline{\underline{H}}$.

5. A method according to claim 4 wherein each subset of elements of the column of the matrix $\underline{\underline{H}}$ comprises a subset of n elements and wherein the reduced set of equations comprises a set of n equations with n unknowns, the n unknowns being the individual parameters $x_1, x_2, \ldots, x_n$ of the parameter vector $\underline{x}=[x_1, x_2, \ldots X_n]^T$.

6. A method according to claim 1 comprising, prior to determining the set of α values, individually dividing each row $z_i=\underline{H}_i\underline{x}+v_i$ of the measurement equation by a suitable normalization constant to obtain a normalized measurement equation wherein $z_i$ for each row is 0.1 and using components of the normalized measurement equation in the place of corresponding components of the measurement equation for determining the set of α values and forming the reduced set of equations.

7. A method according to claim 6 comprising conducting an inquiry into whether any of the α values are greater than or equal to unity and, if any one or more of the α values are greater than or equal to unity: dividing the entire normalized measurement equation by a suitable multiple of 10 to obtain a scaled measurement equation; repeating determining the set of α values for each column using the scaled measurement equation; and using components of the scaled measurement equation in the place of corresponding components of the normalized measurement equation for forming the reduced set of equations.

8. A method according to claim 1 comprising conducting an inquiry into whether any of the α values are greater than or equal to unity and, if any one or more of the α values are greater than or equal to unity: dividing the entire measurement equation by a suitable multiple of 10 to obtain a scaled measurement equation; repeating determining the set of α values for each column using the scaled measurement equation; and using components of the scaled measurement equation in the place of corresponding components of the measurement equation for forming the reduced set of equations.

9. A method according to claim 6 comprising removing identical rows from the normalized measurement equation to obtain a reduced normalized measurement equation having $m_1$ rows, where $m > m_1 > n$ and using components of the reduced normalized measurement equation in the place of corresponding components of the measurement equation for determining the set of α values and forming the reduced set of equations.

10. A method according to claim 1 wherein the model must satisfy a constraint of the form $\underline{C}\underline{x}=\underline{d}$, where $\underline{C}$ is a 1×n matrix and d is a 1×1 vector.

11. A method according to claim 10 wherein each subset of elements of the column of the matrix $\underline{H}$ comprises a subset of n−1 elements and wherein forming the reduced set of equations comprises forming a set of n equations with n unknowns, the n unknowns being the individual parameters $x_1, x_2, \ldots x_n$ of the parameter vector $\underline{x}=[x_1, x_2, \ldots x_n]^T$, the set of n equations with n unknowns comprising: n−1 individual equations based on the n−1 rows of the measurement equation corresponding to the row combination with the lowest α sum wherein the corresponding values of the disturbance vector $\underline{v}$ for the n−1 equations are set to zero; and 1 individual equations of the constraint $\underline{C}\underline{x}=\underline{d}$.

12. A method for fitting a model to a set of data, implemented by a computer system comprising a processor and memory storing instructions which, when executed by the processor, cause the processor to perform the method, the method comprising:
    (a) providing a model characterized by a n×1 parameter vector $\underline{x}=[x_1, x_2, \ldots x_n]^T$ having n individual parameters $x_1, x_2, \ldots x_n$;
    (b) obtaining m sets of data from a system under consideration where m>n;
    (c) constructing a measurement equation of a form $\underline{z}=\underline{f}(\underline{a}, \underline{x})+\underline{v}$ based on the m sets of data and the parameter vector $\underline{x}$, wherein each one of the m sets of data is used to construct $z_i$ and $f_i(a_i, \underline{x})$ of a corresponding component $z_i=f_i(a_i, \underline{x})+v_i$ of the measurement equation and $\underline{v}$ represents a m×1 disturbance vector $\underline{v}=[v_1, v_2, \ldots v_m]^T$;
    (d) estimating an initial state $\underline{x}_o$ of the parameter vector $\underline{x}=[x_1, x_2, \ldots x_n]^T$;
    (e) linearizing each component $z_i=f_i(a_i, \underline{x})+v_i$ of the measurement equation using a Taylor series expansion and constructing a linearized measurement equation of a form $\Delta\underline{z}=\underline{H}\Delta\underline{x}+\underline{v}$, wherein each row of the linearized measurement equation has a form $\Delta z_i=\underline{H}_i\Delta\underline{x}+v_i$ and wherein $\Delta\underline{x}=(\underline{x}-\underline{x}_o)$, $\Delta z_i=z_i-f_i(a_i, \underline{x}_o)$ and $$\underline{H}_i = \frac{\partial f_i(a_i, \underline{x})}{\partial \underline{x}}\bigg|_{\underline{x}=\underline{x}_0};$$

(f) for each column of the matrix $\underline{H}$, determining a set of α values wherein each α value is based on a corresponding subset of elements of the column of the matrix $\underline{H}$, the subset of elements determined on the basis of a distinct, non-ordered combination of rows of the matrix $\underline{H}$;
    (g) for each distinct, non-ordered row combination of the matrix $\underline{H}$, determining a corresponding α sum by adding the α values associated with the row combination for each column of the matrix $\underline{H}$; and
    (h) selecting a row combination with a lowest α sum and forming a reduced set of equations based, at least in part, on the rows $\Delta z_i=\underline{H}_i\Delta\underline{x}+v_i$ of the linearized measurement equation corresponding to the row combination with the lowest α sum and wherein corresponding values of the disturbance vector $\underline{v}$ for the reduced set of equations are set to zero;
    (i) solving the reduced set of equations for $\Delta\underline{x}$;
    (j) updating an iterate approximation of the parameter vector $\underline{x}=[x_1, x_2, \ldots x_n]^T$ according to $\underline{x}_{j+1}=\underline{x}_j+\Delta\underline{x}_j$ where j is an iteration counter;
    (k) evaluating one or more iteration termination criteria; and
    (l) if the iteration termination criteria are met, using $\underline{x}_{j+1}$ for the individual parameters $x_1, x_2, \ldots x_n$ of the parameter vector $\underline{x}=[x_1, x_2, \ldots x_n]^T$ to thereby characterize the model, but if the iteration termination criteria are not met, using $\underline{x}_{j+1}$ to update the linearized measurement equation according to $\Delta\underline{x}=(\underline{x}-\underline{x}_{j+1})$, $\Delta z_i=f_i(a_i, \underline{x}_{j+1})$ and $$\underline{H}_i = \frac{\partial f_i(a_i, \underline{x})}{\partial \underline{x}}\bigg|_{\underline{x}=\underline{x}_{j+1}}$$

and iteratively repeating steps (f) through (l) until the iteration termination criteria are met; and,
    (m) outputting a characterization of the model after the iteration termination criteria are met.

13. A method according to claim 12 wherein, after selecting the row combination with the lowest α sum on a first iteration: updating only the rows of the linearized measurement equation corresponding to the row combination selection in step (l); maintaining the row combination selection for subsequent iterations; and iteratively repeating only steps (h) through (l) in the subsequent iterations.

14. A method according to claim 12 wherein the iteration termination criteria comprise threshold criteria on one or more of: $\Delta\underline{x}$; a number of iterations; and a cost function $$J = \sum_{i=1}^{m} |z_i - f_i(a_i, \underline{x})| = \sum_{i=1}^{m} |v_i|.$$

15. A method according to claim 12 wherein obtaining the m sets of data from the system under consideration comprises applying m sets of known inputs to the system and, for each set of inputs, determining a corresponding output of the system.

16. A method according to claim 15 wherein determining the corresponding output of the system comprises measuring the corresponding output using a measurement apparatus.

17. A method according to claim 12 wherein, for each column of the matrix H, determining the set of α values wherein each α value is based on the corresponding subset of elements of the column of the matrix $\underline{H}$ comprises, for each α value, summing the absolute values of the corresponding subset of elements of the column of the matrix H.

18. A method according to claim 17 wherein each subset of elements of the column of the matrix H comprises a subset of n elements and wherein the reduced set of equations comprises a set of n equations with n unknowns, the n unknowns corresponding to elements of $\Delta\underline{x}$.

19. A method according to claim 12 comprising, prior to determining the set of α values, individually dividing each row $\Delta z_i = \underline{H}_i \Delta \underline{x} + v_i$ of the linearized measurement equation by a suitable normalization constant to obtain a normalized linearized measurement equation wherein $\Delta z_i$ for each row is 0.1 and using components of the normalized linearized measurement equation in the place of corresponding components of the linearized measurement equation for determining the set of α values and forming the reduced set of equations.

20. A method according to claim 19 comprising conducting an inquiry into whether any of the α values are greater than or equal to unity and, if any one or more of the α values are greater than or equal to unity: dividing the entire normalized linearized measurement equation by a suitable multiple of 10 to obtain a scaled linearized measurement equation; repeating determining the set of α values for each column using the scaled linearized measurement equation; and using components of the scaled linearized measurement equation in the place of corresponding components of the normalized linearized measurement equation for forming the reduced set of equations.

21. A method according to claim 12 wherein the model must satisfy a constraint of a form $g(a, \underline{x}) = 0$ having l components of a form $g_i(a_i, \underline{x}) = 0$, wherein linearizing in step (e) comprises linearizing each component $g_i(a_i, \underline{x}) = 0$ of the constraint using a Taylor series expansion to construct a linearized constraint of a form $\underline{C}\Delta\underline{x} = \underline{d}$, wherein each row of the linearized constraint has a form $\underline{C}_i \Delta \underline{x} = d_i$ and wherein $$\underline{C}_i = \frac{\partial g_i(a_i, \underline{x})}{\partial \underline{x}} \bigg|_{\underline{x}=\underline{x}_0}$$

and $d_i = -g_i(a_i, \underline{x}_o)$ and wherein step (1) comprises using $\underline{x}_{j+1}$ to update the linearized constraint according to $$\underline{C}_i = \frac{\partial g_i(a_i, \underline{x})}{\partial \underline{x}} \bigg|_{\underline{x}=\underline{x}_j}$$

and $d_i = -g_i(a_i, \underline{x}_j)$.

22. A method according to claim 21 wherein each subset of elements of the column of the matrix $\underline{H}$ comprises a subset of n-1 elements and wherein forming the reduced set of equations comprises forming a set of n equations with n unknowns, the n unknowns corresponding to elements of $\Delta\underline{x}$, the set of n equations with n unknowns comprising: n-1 individual equations based on the n-1 rows of the linearized measurement equation corresponding to the row combination with the lowest α sum wherein the corresponding values of the disturbance vector $\underline{v}$ for the n-1 equations are set to zero; and/individual equations of the linearized constraint $\underline{C}\Delta\underline{x} = \underline{d}$.

23. A computer program product, comprising non-transitory storage media, carrying machine-readable code, which when executed by a suitably configured processor causes the processor to perform the method of claim 1.

24. A computer program product, comprising non-transitory storage media, carrying machine-readable code, which when executed by a suitably configured processor causes the processor to perform the method of claim 12.

* * * * *